United States Patent
Kumar et al.

(10) Patent No.: US 11,907,107 B2
(45) Date of Patent: Feb. 20, 2024

(54) AUTO TEST GENERATOR

(71) Applicant: Cerner Innovation, Inc., North Kansas City, MO (US)

(72) Inventors: Amit Amar Kumar, Bangalore (IN); Chaithrika Rao, Bangalore (IN); Shiv Shankar, Bangalore (IN); Uttam B. Ramamurthy, Bangalore (IN); Pratik Nath, Bangalore (IN)

(73) Assignee: Cerner Innovation, Inc., Kansas City, MO (US)

( * ) Notice: Subject to any disclaimer, the term of this patent is extended or adjusted under 35 U.S.C. 154(b) by 0 days.

(21) Appl. No.: 17/845,542

(22) Filed: Jun. 21, 2022

(65) Prior Publication Data

US 2022/0318130 A1  Oct. 6, 2022

Related U.S. Application Data

(63) Continuation of application No. 16/889,009, filed on Jun. 1, 2020, now Pat. No. 11,392,485.

(51) Int. Cl.
| | |
|---|---|
| *G06F 11/00* | (2006.01) |
| *G06F 11/36* | (2006.01) |
| *G06F 18/21* | (2023.01) |
| *G06V 30/10* | (2022.01) |

(52) U.S. Cl.
CPC ........ *G06F 11/368* (2013.01); *G06F 11/3664* (2013.01); *G06F 11/3684* (2013.01); *G06F 11/3688* (2013.01); *G06F 18/217* (2023.01); *G06V 30/10* (2022.01)

(58) Field of Classification Search
None
See application file for complete search history.

(56) References Cited

U.S. PATENT DOCUMENTS

| | | | |
|---|---|---|---|
| 9,268,672 B1* | 2/2016 | Gupta | G06F 11/3684 |
| 2010/0229155 A1 | 9/2010 | Adiyapatham et al. | |
| 2012/0260129 A1 | 10/2012 | Wilson et al. | |
| 2017/0199811 A1 | 7/2017 | Narayan et al. | |
| 2019/0155722 A1* | 5/2019 | Gupta | G06N 20/00 |
| 2020/0019492 A1 | 1/2020 | Fei et al. | |
| 2020/0379887 A1 | 12/2020 | Nochilur | |
| 2021/0374040 A1 | 12/2021 | Kumar et al. | |
| 2022/0206927 A1* | 6/2022 | Bakshi | G06Q 30/0631 |

OTHER PUBLICATIONS

Google Scholar/Patents—text refined (Year: 2023).*
Google Scholar/Patents search—text refined (Year: 2023).*

* cited by examiner

*Primary Examiner* — Christopher S McCarthy
(74) *Attorney, Agent, or Firm* — Invoke

(57) ABSTRACT

The technology disclosed relates to generating automated test plan scripts. Repository data associated with a test plan script is received. Source code and test plan solution data corresponding to the repository data are analyzed. For example, the repository data may be analyzed using natural language processing and static code analysis. In some embodiments, test steps of the test plan are performed to generate repository data. A suggestion of a reusable component for a particular test step or test validation is provided for one or more of the test steps. A selection of the suggestion of the reusable component for at least one of the test steps is received. An automated test plan script corresponding to the selection is generated.

20 Claims, 20 Drawing Sheets

| InputFile (602) | SimilarImages (604) | Path (606) | OCR_Text_Matched (608) | OCR_Input_Text (610) |
|---|---|---|---|---|
| C:/Aiswarya/Connect_ImageSearch/POC2/DeviceLinkImages/Images/PreprocessedImages\Configuration.png | C://Aiswarya/Connect_ImageSearch/POC2/SharedRepo///Images\\Configuration_TopLeft.pgn | OCR | Configuration: | Configuration: |
| C:/Aiswarya/Connect_ImageSearch/POC2/DeviceLinkImages/Images/PreprocessedImages\Configuration_0001.png | C://Aiswarya/Connect_ImageSearch/POC2/SharedRepo///Images\\iCommandConfiguration_new_1.png | OCR | \| Configuraton | \| Configuration \|<br>ififfi |
| C:/Aiswarya/Connect_ImageSearch/POC2/DeviceLinkImages/Images/PreprocessedImages\Container.png | C://Aiswarya/Connect_ImageSearch/POC2/SharedRepo///Images\\Label_driverContainer01.png | OCR | DriverContainer | Container |
| C:/Aiswarya/Connect_ImageSearch/POC2/DeviceLinkImages/Images/PreprocessedImages\CopyfromClipboard.png | C://Aiswarya/Connect_ImageSearch/POC2/SharedRepo///Images\\Button_CopytoClipboard.png | OCR | Copy from Clipboard | Copy from Clipboard |
| C:/Aiswarya/Connect_ImageSearch/POC2/DeviceLinkImages/Images/PreprocessedImages\Customforcomponent10.png | C://Aiswarya/Connect_ImageSearch/POC2/SharedRepo///Images\\CustomComponent10.png | OCR | Custom Component 10 | Custom Component 1 n |
| C:/Aiswarya/Connect_ImageSearch/POC2/DeviceLinkImages/Images/PreprocessedImages\Device.png | C://Aiswarya/Connect_ImageSearch/POC2/SharedRepo///Images\\ProviderSearch.png,C://Aiswarya/Connect_ImageSearch/POC2/SharedRepo///Images\\SelectPermissionGroupWindow1.png | Hash | | |
| C:/Aiswarya/Connect_ImageSearch/POC2/DeviceLinkImages/Images/PreprocessedImages\Domain.png | C://Aiswarya/Connect_ImageSearch/POC2/SharedRepo///Images\\TextBox_Domain_revCycleApp.png | OCR | Domain: | Domain: |
| C:/Aiswarya/Connect_ImageSearch/POC2/DeviceLinkImages/Images/PreprocessedImages\Domain_0001.png | C://Aiswarya/Connect_ImageSearch/POC2/SharedRepo///Images\\Domain.png | OCR | Domain: | Domain: |
| C:/Aiswarya/Connect_ImageSearch/POC2/DeviceLinkImages/Images/PreprocessedImages\Environment.png | C://Aiswarya/Connect_ImageSearch/POC2/SharedRepo///Images\\EnviornmentDropdown.png | OCR | Environment: | Environment: |
| C:/Aiswarya/Connect_ImageSearch/POC2/DeviceLinkImages/Images/PreprocessedImages\FetchUsernamePassowrkdfromiBus.png | C://Aiswarya/Connect_ImageSearch/POC2/SharedRepo///Images\\Button_FetchUsernamePassword.png | OCR | Fetch Username Password from iBus | Fetch Username |
| C:/Aiswarya/Connect_ImageSearch/POC2/DeviceLinkImages/Images/PreprocessedImages\FINNRPR.png | C://Aiswarya/Connect_ImageSearch/POC2/SharedRepo///Images\\Textbox_FIN_1801.png | OCR | FIN NBR: | FIN NRR: |
| C:/Aiswarya/Connect_ImageSearch/POC2/DeviceLinkImages/Images/PreprocessedImages\Flowsheet.png | C://Aiswarya/Connect_ImageSearch/POC2/SharedRepo///Images\\Flowsheet_new_1.png | OCR | Flowsheet | Flowsheet |
| C:/Aiswarya/Connect_ImageSearch/POC2/DeviceLinkImages/Images/PreprocessedImages\Flowsheet_0001.png | C://Aiswarya/Connect_ImageSearch/POC2/SharedRepo///Images\\Dropdown_Flowsheet_3.png | OCR | Flowsheet | Flowsheet |
| C:/Aiswarya/Connect_ImageSearch/POC2/DeviceLinkImages/Images/PreprocessedImages\FullScreen.png | C://Aiswarya/Connect_ImageSearch/POC2/SharedRepo///Images\\FullScreen.png | OCR | Full Screen | Full Screen |

```
(* * * * * * * * * * * * * * * * * * * * * * * * * * * * * * * * *
   Script generated: 2019-01-31 12:29:04
   From session: SubscriptionView
   Captured on: 2019-01-31 12:15:43
   From server: FanaudCloud
* * * * * * * * * * * * * * * * * * * * * * * * * * * * * * * *)

Click "Icon_windows/windows_run"
TypeText "run"
TypeText Return/key
Typetext "C:/Applications/iCommandBus/iCommand.exe"
TypeText Return/key
Click (Image:"icon_company" , WaitFor:15)
TypeText "dimage_bbexc",Tab/key,careware",Tab/key,"careware", Tab_Returnkey
Click (Image: "button_bk/1".WaitFor:15)
Click "icon_imageing/image0001"
Click "button_management/managementpnt"
Click "button_system/System"
Click "tab_subscriptionViews/Subscription View"
DoubleClick "icon_expand/image0001"

//To Create and check Shared durable
Click "Icon_windows/windows_run"
TypeText "run"
TypeText Return/key
TypeText "cmd",Return/key
Click 'Icon_windows/image0006"
TypeText "id C\Applicaion\Ion,SharedDurableJars\SharedDurableJars"
TypeText Returnkey
TypeText "java-jar SharedDurable.jar"
TypeText Returnkey
TypeText "dwing_bboc",Returnkey
TypeText "TextGroupSharedDurable",Return/key
Click "Icon_windows/image0010"
Click "Icon_wondows/image0013"
Click "Icon_wondows/Asear"
TypeText "TextGrouphandDurable"
Click "Icon_window/TextGrouphandDurable"
Click "Icon_windows/image0014"
//To Create and check Shared non-durable
Click "Icon_windows/windows_run"
TypeText "run"
TypeText Returnkey
```

*FIG. 7.*

Auto Test Generator-Prerequisites

| Action Handler | Validation Handler | Generate Handler | Default |

Validation Handler

| | | |
|---|---|---|
| ☐ | "CommandLogInUtilities"."traditionalLogIn environment, username, password | Git Links |
| ☐ | "CommandLogInUtilities"."cloudLogin environment, Tenant, username, encriptedPassword | Git Links |
| ☑ | "CommandLogInUtilities"."cloudLogin environment, Tenant, username, password | Git Links |
| ☑ | "DefineExecutionEnvironment"."handle ExecutionDomainInfo strconfig_path,strExecutionEnvironment | Git Links |
| ☐ | "P2DAUtilities:.LoginP2DAapp strUsername,strPassword,strEnvironment | Git Links |
| ☐ | "DefineExecutionEnvironment"."handle ExecutionEnvironment with strtoolsPath,strconfig_path,strExecutionEnvironment | Git Links |
| ☐ | "CommandConfigurationSystem"."handleSetFocusToChildConfiguration with ConfigurationName, ChildConfiguration1, ChildConfiguration2 | Git Links |
| ☐ | "CommandAlertUtilities"."dynamicChangeDeviceLocation A1, A2, A3, A4, A5, A6 | Git Links |
| ☐ | "CommandConfigurationSystem"."UpdateMillennium strDomainName,strUsername,strPassword,strLogicalDomain,strOracleUsername,strOraclePassword,strConnectionString | Git Links |
| ☐ | "CommandLogInUtilities"."enterUsername username | Git Links |

[Save] [Edit]   [Submit]   [Cancel]
1206  1208    1210        1212

```
/******************************
Script Name: EDC-VR-iCommand-Login
RQM test case id: 1446
RQM test case link: https://jazz.company.com:9443/qm/web/console/IP#action=com.ibm.rqm.planning.home.actionDispatcher&subAction=viewTestCase&id=1446
Author: CR0117933
Date of creation: 2020-02-20
*******************************/

//Global properties
set the nextkeydelay to 2 //Default Value 0.01
set the remoteworkinterval to 1 //Default Value 0.7
set the keydowndelay to .2 //Default Value 0.001
set the standardimagetolerance to 50 //Default Value 45;
set the mouseclickdelay to .5 //Default Value 0.02
set the mousedoubleclickdelay to .004 //Default Value 0.01
set the mousedragspeed to 12 //Default Value 10
set the mousemovedelay to .06 //Default Value 0.01
set the waitfor to 90 //Default Value 90

Set dataFile to JSONValue(file ResourcePath(EDC-VR-iCommand-Login.json))

"CleanUp":"ZeroStateCloseAllApps" // (automationtool Suite: https://github.company.com/automationtool/IPDev-Shared-Millenium/blob/master/IPDev-Shared-Millenium.suite/Scripts/CleanUp.script)

//Prerequisites START ~1604
(*
EDC-VR-iCommand Login

Requirement(s):
https://wiki.company.com/display/public/DevMethodology/iCommand+Functionals
Requirement ID(s): 1, 2, 7.1, 7.2, 7.3, 7.4, 8, 9
Prerequisites:
1. Access to: latest iCommand version installed locally.

2. Users created within HNAUSER.exe prior to testing with the following Privilege/Restrictions:
User 1: valid username and password User 2: account disabled
 User 3: pre-expired password
 3. Update ini field for a traditional environment.
*)
//Prerequisites END Try
(*
  Click (imageName:"image0001", waitFor:60)
  Click (imageName:"RD Warning-OK/iCommandTesting", waitFor:60)
  Click (imageName:"ManageContainer/tkiCommandexe", waitFor:60)
  TypeText dataFile.inputText1.Return
  Click (imageName:"Label_HL7ClientEngineService/image0001", waitFor:60)
*)

Run iCommandLoginUtilities.LaunchiCommand dataFile.icommand.Path
```

FIG. 16.

AUTO TEST GENERATOR

CROSS-REFERENCE TO RELATED APPLICATION

This application is a continuation of U.S. patent application Ser. No. 16/889,009, filed on Jun. 1, 2020, and entitled "Auto Test Generator"; which is incorporated by reference herein.

BACKGROUND

Test scripts in software testing are sets of instructions to be performed on a system to test the functioning of the system. Testing the function of the system involves numerous attributes or pieces of a program. Some examples include testing every possible input to every variable, testing every possible combination of inputs to every combination of variables, testing every possible sequence through the program, testing all hardware configurations and all software configurations, and testing all ways a user may use the program. Often, a goal for testing the system is to try achieving close to complete coverage without missing particular code, data values and data combinations, and interruptions and other parallel operations. Complete coverage may not be the goal if the schedule for developing the software is aggressive. If development needs hastened, investments of time, human and monetary resources may need reduced. For example, certain testing phases may need accelerated or curtailed for more rapid development.

Testing is important for facilitating quality software. One benefit of a test script is that it predefines a procedure to follow for testing. This permits advance knowledge of conditions to be tested and an expectation of how they should behave. Accordingly, some test scripts are created for definable processes that are critical and apply well to scripting. For example, test scripts may be a primary mean for test designs for procedural applications. Well-defined test scripts provide a trail to follow for repeat tests. However, unrepeatable tests would require redundant efforts for retesting, which result in a product with short revision cycles and other problems.

Test scripts are typically executed manually. Manual test scripts guide a user in what to enter into each field on a screen and when to go to another field. Manual testing is a lengthy process requiring the user to work for several days before the testing is complete. A major concept of manual tests is for ensuring an application is free from error and works with specified functional requirements. Manual testing often requires skilled labor in addition to the large amounts of time involved. The amount of time required and redundancy often leads to boredom, which may result in inattention or error. Further, multilingual sites are difficult for manual tests.

One way to improve the shortcomings of manual testing involve automation. New applications are tested manually before any part of the testing may be automated. Some advantages of automated testing include execution of tests without the continuous need for human intervention, easy repeatability, faster testing, broadened test coverage, reduced human error, and the ability to run unattended tests overnight or during weekends and holidays. Automation is beneficial in situations where the test is to be executed several times, such as regression testing for example.

Automation has several challenges. For example, selecting the right tool and the proper testing approach is not often a straightforward analysis. If done inefficiently, automation may result in more tied-up resources and a reduction in efficiency. In addition, it is important that testing to be automated is not poorly written, because this would result in flawed testing. Further, not all test cases are currently suitable for automation. Accordingly, a new tool that aims to accelerate test case automation without tying up too many resources and without resulting in flawed testing is desirable.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

At a high level, aspects described herein relate to systems and methods for generating an automated test plan script. A selection of a first test plan to automate is received. Test scripts and data from a repository are retrieved. The test scripts and the data correspond to the first test plan. Test steps of the first test plan are performed. A prediction, for each of the test steps, of a reusable component is provided. The reusable component may be used for a particular test step or test validation. Further, a selection of at least one prediction for at least one of the test steps is received. Accordingly, an automated test plan script corresponding to the selection is generated.

Additional objects, advantages, and novel features of the technology will be set forth in part in the description which follows, and in part will become apparent to those skilled in the art upon examination of the following or learned by practice of the technology.

BRIEF DESCRIPTION OF THE DRAWINGS

The present technology is described in detail below with reference to the attached drawing figures, wherein:

FIG. 6 is an API call to fetch test plan details from various test plans, according to one embodiment;

FIG. 7 is a final automation script, according to one embodiment;

FIG. 12 is a screenshot of a validation handler with two selected recommended scripts, according to one embodiment;

FIG. 16 is a screenshot of script output, according to one embodiment;

Figure 1:
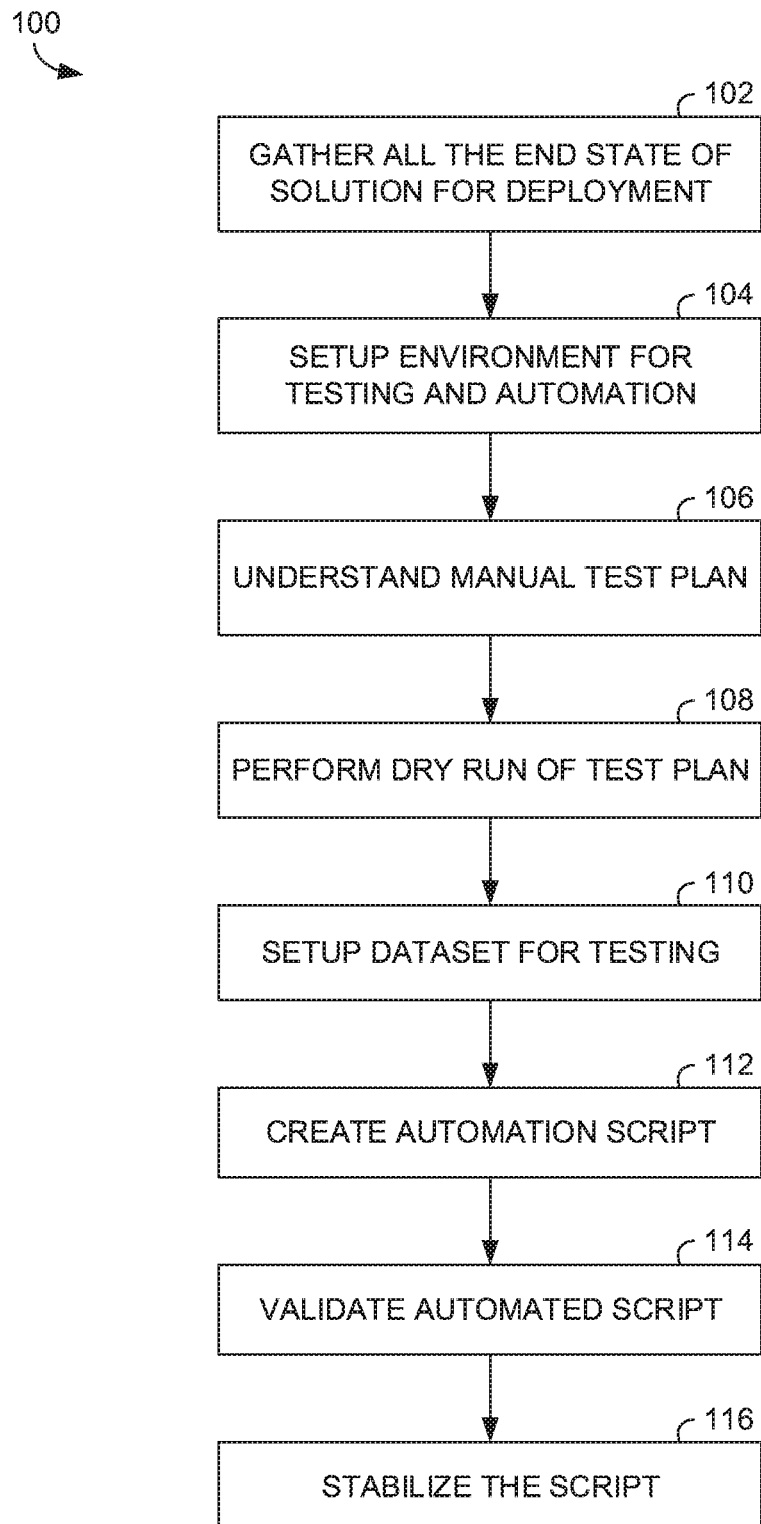
FIG. 1 is a flow diagram of a process for creating an automation test script, according to one embodiment.

These drawings do not limit the present technology to the specific embodiments disclosed and described herein. The drawings are not necessarily to scale; emphasis instead is placed upon clearly illustrating the principles of the present technology.

DETAILED DESCRIPTION

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the term "step" might be used herein to connote different elements of methods employed, the term should not be interpreted as implying any particular order among or between various steps herein disclosed unless and except when the order of individual steps is explicitly stated.

With regard to the drawings in general, we show certain items in block-diagram form more for being able to reference something consistent with the nature of a patent rather than to imply that a certain component is or is not part of a certain device. Similarly, although some items are depicted in the singular form, plural items are contemplated as well (e.g., what is shown as one data store might really be multiple data stores distributed across multiple locations). But showing every variation of each item might obscure some embodiments. Thus for readability, we show and reference items in the singular (while fully contemplating, where applicable, the plural).

The subject matter of the present technology comprises a new automated test generator ("ATG") capable of accelerating test case automation without tying up too many resources and without resulting in flawed testing. Accelerated test automation is provided, at least in part, by generating draft automated script as output. The ATG is capable of interacting with an automation tool such as eggPlant, test management tools such as Rational Quality Manager (RQM), and code repository such as Git. Accordingly, the ATG can identify existing patterns in various test plans and reusable components for leveraging the generation of a draft script for a new test plan.

As software is developed and adopted at accelerated rates, traditional software development processes become strained. The ATG may alleviate this strain. Additionally, the ATG has several other advantages. The ATG programmatically ensures workflow was performed the way it was intended to perform, enables streamlining of new processes, and provides enhanced quality script results. Further, the ATG is useful and beneficial in the following situations: moving functional testing solutions to the cloud and enabling central deployment, enabling achievement of a desired future state through faster automation of current test plans and new test plans, and automating test plans. With respect to the latter, the ATG enables an increase to the total efficiency of automation processes. Further detail and a working example is provided herein.

On the other hand, prior conventional technologies may have automated certain parts of a particular test plan, but those technologies tied up too many resources in the process or resulted in flawed testing. Further, prior conventional technologies have not automated their respective test plans by generating draft automated script as output or by generating scripts for new plans. Prior conventional technologies have also not provided predictions of reusable components for particular test steps or for test validation. Accordingly, the ATG improves upon these deficiencies.

Turning now to FIG. 1, example flow diagram 100 illustrates a process for creating an automation test script. Steps 102 and 104 are associated with ATG infrastructure; steps 106, 108, and 110 are associated with ATG functional aspects; and steps 112, 114, and 116 are associated with ATG automation. At step 102, end states of a solution for deployment are gathered. The deployment may consist of several interrelated activities that may have transitions in between the activities. Each activity may have a specific process or procedure defined. Deployment may comprise placing written code for a site on a web server, or installing a copy of the software for users on a production server in a production environment. The software may also be installed in a test environment, a development environment, or a recovery environment. The deployment may involve a testing cycle comprising environment backups, bug fixes, and retesting of new features. Deployment may occur progressively in a customized order. End states may be determined using end user feedback, intended use of the solution, or a combination of both.

At step 104, an environment for testing and automation is set up. The environment may comprise an electronic health record (EHR) system, a user interface, a data storage, and a computing device. Each of these components may communicate through a network. The network may include, without limitation, one or more local area networks (LANs) and/or wide area networks (WANs). In example implementations, the network comprises the Internet and/or a cellular network, amongst any of a variety of possible public and/or private networks. Other wireless technologies for transferring data, such as Bluetooth, are contemplated as well. In some embodiments, one or more of the components may be in direct communication via a communication bus.

As noted above, the software may be installed in the production environment, the test environment, the development environment, or the recovery environment, for example. The production environment may comprise a network of many geographically distributed machines in data centers. In some embodiments, the environment may comprise virtual machines in cloud computing. Further, the environment may permit a structured release management process for phased deployment. Differing configurations of the system (e.g., updated versions) may simultaneously exist in an environment for differing internal or external users. A manager may automatically uninstall previous versions or track each version. Additionally, the environment may be prepared to minimize test environment defects by, for example, creating effective test data that exposes flaws in code or features which impact the quality of the product.

At step 106, a manual test is understood. One example of a manual test includes a vertical regression ("VR"). VR tests existing functionality and may require constant repetition. The VR test may be used on multiple release cycles for preventing new developments from causing bugs or breaks. The VR test may also be used for detecting regression caused by updates or new browser versions as well. The VR test may require both white box testing and black box testing. The VR test may be designed from the perspective of the end user and may focus on testing a portion of existing features of the system. The VR test may consider multiple scenarios for creating multiple test cases and may create different sets of test cases for multiple scenarios of the system. Further, repeatable and stable VR tests may be automated, the automation providing free time to testers to attend to other issues.

At step 108, a dry run of the test plan is performed. In one embodiment, the dry run is manually conducted first on a prioritized test case and thereafter run manually on a test case with a lower priority. Continuing the example, the prioritized case was prioritized because it will be beneficial on subsequent versions or because it is specifically beneficial to a particular version of the software. In some embodiments, the VR test may be launched during a build process by automatically launching a set of tests against an application. The VR test may identify functions with changed performance after the release of a new version. The VR test results may be presented as a visualization or graph. Depending on the complexity of the code, additional dry runs may be conducted. Retesting may be carried out if a defect is detected.

At step 110, a dataset for testing is setup. The dataset comprises results from the VR test or results from multiple VR tests. The dataset may comprise data from existing sources and data generated from large volumes of test data. Datasets may comprise data collected for each function of an application and for different sequences of inputs. The datasets may comprise data from open source or other local or publically available libraries. Additionally, the datasets may comprise data from many devices and large datasets may comprise data with statistically meaningful comparisons between versions of an application. Datasets may also comprise data from the visualization or the graph of the VR test results.

At step 112, an automation script is created. The automation script may be created on a construction page or from within a test case. For creating the automation script from the construction page, a descriptive name identifying the purpose of the automation script may be entered. For creating the automation script from within the test case, a test case may be opened and a descriptive name identifying the purpose of the script may be entered. After creating the test script shell, the dataset for the testing is added, categories are defined, values are assigned to customary attribute fields, an action to be taken is described, and expected results are specified. A single automation script may be used to test multiple datasets.

At step 114, an automated script is validated. Aspects of the present disclosure allow for new changes to the system to be validated at a faster pace. Validation may comprise basic validations, such as whether or not an image was found or not found. Validations may be customized by applying "assert" statements or "if/else" statements. Expected results are validated at each step. For example, the system may display a popup window suggesting action and validation handlers for given steps. Parameterization of different variables and attributes may need validated. Screen prints or screenshots may be used as evidence that particular results were validated at particular steps. Validation statements for each step may be displayed. Without validating modified data, incorrect conclusions of particular tests may arise.

At step 116, the script is stabilized and less subject to changes. Stabilized scripts result in reliable automated testing. Unstable scripts may be a result of the testing environment, test framework, or the test itself. Failed tests may be due to issues with a server or network or a faulty commit. In some embodiments, instability may be reduced by implementation of a mock server. Continuing the example, a frontend may receive a request and subsequently call the mock server instead of a backend server to reduce dependency on the network or the backend. Additionally, the mock server may be integrated into a client.

Figure 2:
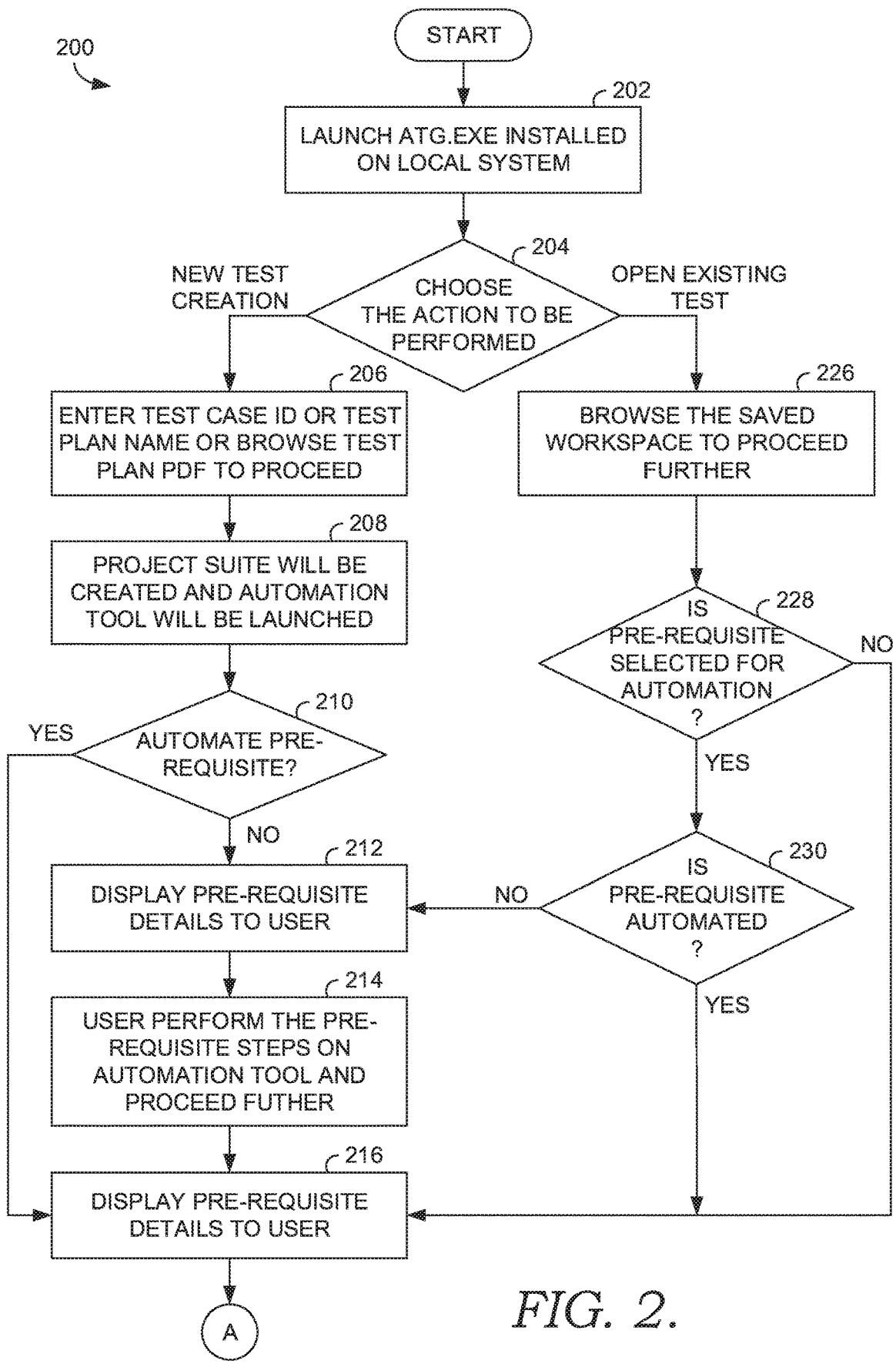
FIG. 2 is a flow chart of a method for generating automation test scripts, according to one embodiment.
Figure 2:
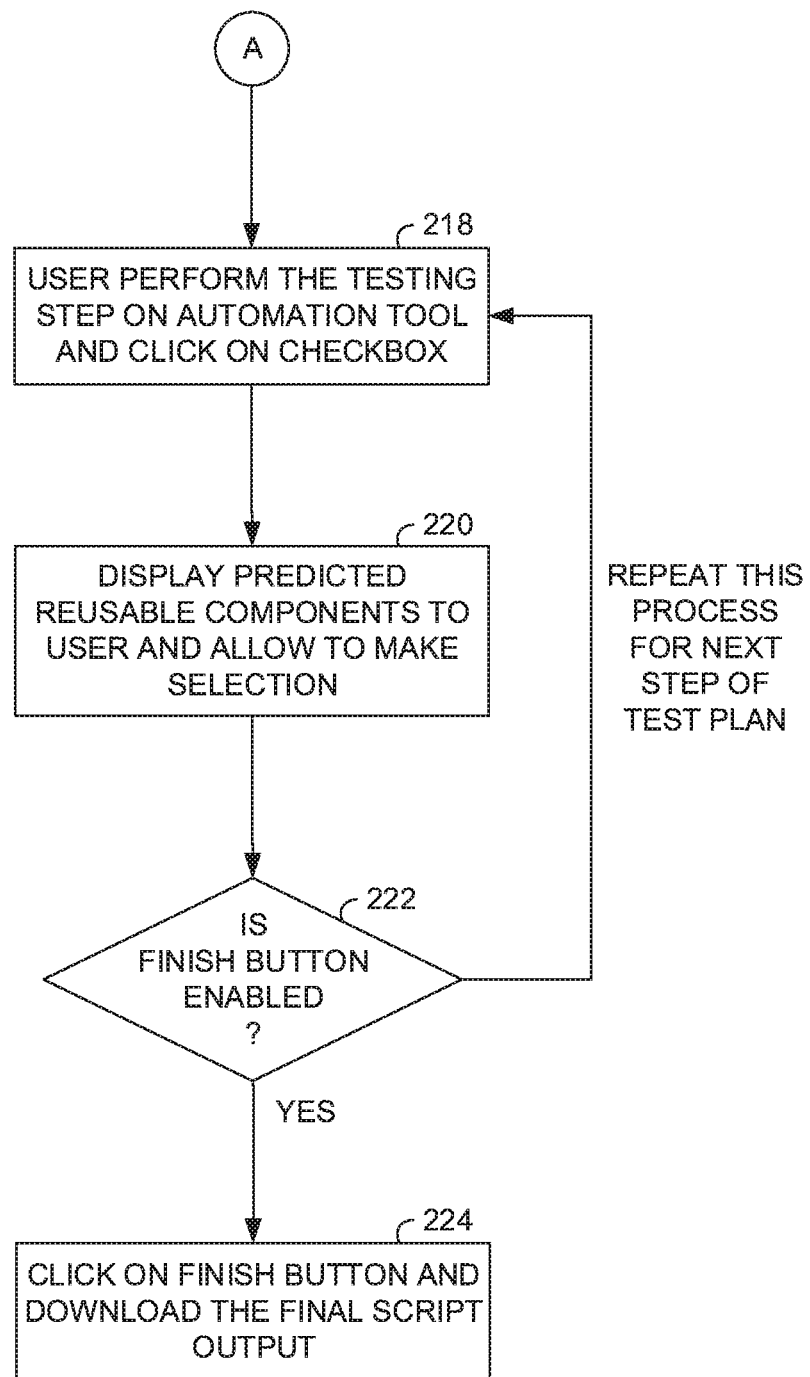

Turning now to FIG. 2, a method 200 for generating automation test scripts is illustrated. The method 200 may launch ATG installed on a local system at 202. An automation tool, such as eggPlant for example, compatible with the ATG may have already been installed prior to the launching. Following the launching at 202, at 204 a user will select to create a new test or to open an existing test. In embodiments, the selection may be automatic depending upon predetermined rules. If a new test is created, at 206 a test case ID or a test case plan name may be entered. Instead of entering the ID or the name, a test plan identifier may be browsed. By selecting a test plan identifier, a workflow may begin by resuming from a previous script for the continuation of scripting. Alternatively, a new test case may be created using offline file browsing. Accordingly, details of a test case may be downloaded from a test management tool, such as RQM, for initiating scripting continuing from the details downloaded from the test management tool.

At 208, a project suite is created and an automation tool is launched. Successful ATG launching may be verified and a user interface (UI) may be updated to reflect a user's interaction with the UI. At 210, a user may be prompted to select whether pre-requisites will be automated. In some embodiments, selection of whether pre-requisites will be automated will be determined by a computing device based on predetermined logic. For example, a pre-requisite may be that a user is authorized. If the pre-requisites are to be automated, then at 216 the pre-requisite details are displayed to a user. If the pre-requisites are not to be automated, at 212 the pre-requisite details are to be displayed to a user. After the details are displayed in the situation where the pre-requisites are not to be automated, a user performs the pre-requisite steps on the automation tool at 214. After the user performs the pre-requisite steps, the pre-requisite details are displayed at 216.

Referring back to 204, the user may instead select to open an existing test. In embodiments, the selection may be automatic depending upon predetermined rules. Accordingly, at 226, the user may browse through saved workspaces to select an existing test. The workspace may be stored locally at the computing device the user is using or at an external computing device and/or server. Afterwards, the user is prompted to select whether or not to automate pre-requisites at 228. If the user selects not to automate the pre-requisites, then the pre-requisite details are displayed to the user at 216. If the user selects to automate the pre-requisites, and if the pre-requisite is thereafter automated at 230, then the pre-requisites are displayed to the user at 216. If however, the user selects to automate the pre-requisites but the pre-requisite is thereafter not automated at 230, then the pre-requisite details are displayed to the user at 212 so that the user may manually perform the pre-requisite steps on the automation tool at 214. Thereafter, the pre-requisite details following the manual performance will be displayed to the user at 216.

At 218, the user is prompted to perform the testing step on the automation tool. At 220, predicted reusable components will be displayed to a user for the user to make a selection. The user will then select at least one reusable component that was predicted and if the finish button is not enabled by either the user or the system at 222, then 218 and onward will be repeated for the subsequent test plan step. If the finish button is enabled at 222 by either the user or the system, then a final script will be downloaded.

Figure 3:
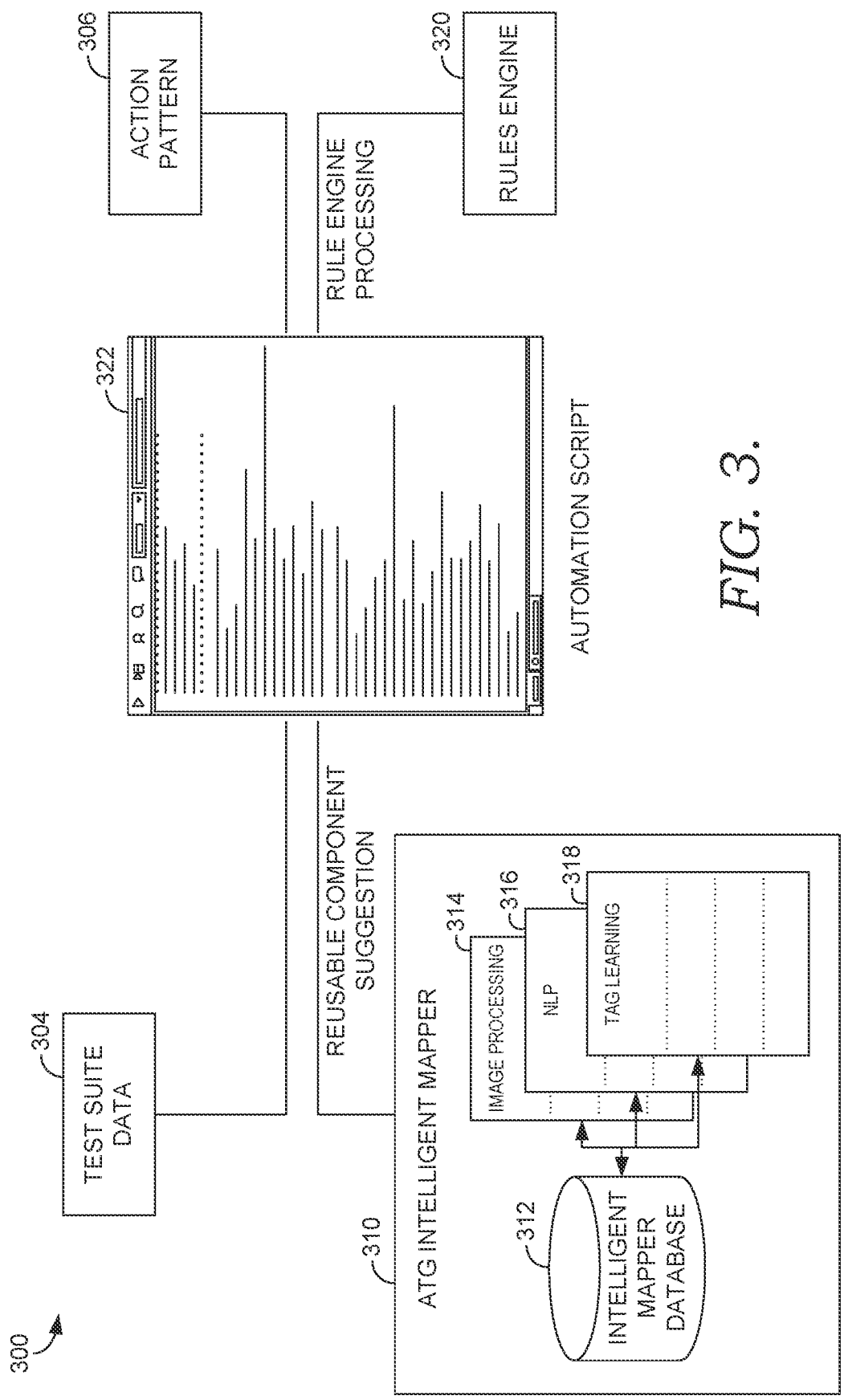
FIG. 3 is an architecture for generating an automation script, according to one embodiment.

Turning to FIG. 3, an example architecture 300 for generating an automation script is provided. At 304, test suite data is received. A user may enter a test plan identifier to initiate the receiving of test suite data. Tests scripts and additional information from a test management tool repository may be received. Test suite data may include data from Rally, Jenkins, TestRail, QAComplete, ALM, TestLink, TestComplete, Zephyr, Bugzilla, Basecamp, Backlog, Asana, GitHub, Bitbucket, Jira, and Trello. The test suite data may be received from these suites prior or subsequent to software developer modification for testing. After receiving the test suite data, pre-conditions and test steps may be displayed to the user. As part of backend processing, the system may create a new project suite in a desired testing framework and the system may launch the automation tool with a newly created project suite as workspace.

At 306, action patterns between the test suite data and test scripts, or intermediate scripts and test steps are identified. Action patterns may be identified by, for example, eggPlant Manager, CloudFlex, Cucumber, Squash, TestLodge, Zephyr, TestingWhiz, or ReQtest. Algorithms (e.g. an explorative or a descriptive algorithm) may identify patterns corresponding to keywords in test steps and historical data from a repository. Data may be filtered prior to pattern identification for a more efficient analysis. Additionally, patterns may be identified using an elastic search or by converting images to optical character recognition and hash code. Machine learning may be used to classify images into classes or categories of objects for identification of patterns. Various models may be trained for attributing varying weights to factors, variables, images, or words of the historical data from the repository, test steps, and intermediate steps for identifying patterns. The various models may be fully or partially trained and the models may be implemented in many ways, for example, neural networks, deep learning systems, deep learning neural networks, etc.

Further, patterns may be used to identify reusable components for generating draft scripts for new test plans. Draft scripts comprise a written description of a set of transactions for execution in test plans. Draft scripts comprise expected results for comparison to actual results. Draft scripts may be accessible by link or other means, may comprise human-readable descriptions or computer-readable instruction, or a combination thereof. Draft scripts may comprise of a reusable component for use in a test step for a test plan, a reusable component for use in test validation of test steps and test plans, a change control of a script, a script for test navigation and action performed, a script for test validation, a clean-up script, logs, test evidence capture script, exception handling, automation best practices handled, and static code analysis handled.

Test plans are documents describing the scope and the activities for software testing. In addition to describing the scope and resources for testing activities, test plans provide a schedule of planned testing activities. Test plans may identify features to be tested and the resources required to carry out the testing. High-level risks and low-level security risks may also be identified in a test plan (e.g. testing for negative requirements for common mistakes, test suspected weaknesses, or other vulnerabilities). Further, test plans may be constructed using project planning tools or schedule tools.

The reusable components may comprise pre-built pieces of code for performing particular functions, such as interactions between controls, the controls including pushbuttons, menus, etc. The reusable components may be created and reused in Java language. Reusable components may be reused in different situations with different data inputs, or may be reused in particular situations with similar data inputs as a previous test case. Reusable components may be generic enough for facile extension of the code after additional testing. Reusable components may be modified if they fail to pass a set of parameters to modify how input or output data are displayed or processed during a test execution. The set of parameters may contain default values that are continuously updated. Further, reusable components may comprise, for example, commands for launching files, logging into a file, browsing, testing, managing testing, completing a load, container management, navigating tabs, and prerequisites. For example, a reusable component may be a JavaScript Enterprise Container component.

Turning now to 310, the ATG Intelligent Mapper 310 comprises an intelligent mapper database 312, image processing 314, natural language processing (NLP) 316, and tag learning 318. The ATG Intelligent Mapper 310 may provide a current snapshot of source code repository, test plan repository, and may perform elastic searches on repository data. The ATG Intelligent Mapper 310 may store the repository data in the intelligent mapper database 312. Intelligent mapper database 312 may be a centralized or a distributed database with associated caches and servers, or various combinations thereof. Various scripts may be stored in the intelligent mapper database 312 for reference at a later time for reuse, modification or automated execution. The intelligent mapper database 312 may store, for example, test plans, test plan names, test plan solutions, details of the test plan solutions, source index files, source code, changes in source code, changes in files or sets of files, reusable component identification, reusable component names, reusable component tags, collections of reusable component tags, image identification, image names, image paths, image types (e.g. optical character recognition type or hash), image tags, and collections of image tags.

The ATG Intelligent Mapper 310 may perform various searches on repository data. Searches may be performed on OpenType fonts, such as Source Code Master Repository for example. In one embodiment, the ATG Intelligent Mapper 310 may search images and convert the images to optical character recognition (OCR) and hash code using the image processing 314. OCR engines, such as Tesseract OCR with packages containing an OCR engine and a command line program for example, support Unicode and may recognize many languages as well as many output formats (e.g. HTML, PDF, plain text, TSV, invisible-text-only PDF). OCR engines are suitable for backend use and may additionally layout analyses on a frontend. One or more visibility tests may need performed on the images searched. For example, pixels may need enlarging, rotations or skews may need corrected, image borders may need removed, or brightness may need adjusted. Images may need additional improvement of quality before converting the image to OCR or hash code. The OCR and hash code may be used to identify reusable component using a collection of the same images. Thereafter, the ATG Intelligent Mapper 310 considers reusable handlers identified and provides a top number of results that are temporarily stored in the intelligent mapper database 312.

In one embodiment, the natural language processing (NLP) 316, may be employed to a search by parsing and semantically interpreting data from the repository, test plans, and test steps. The NLP 316 may rely on machine learning for interpreting the data. In some embodiments, test script description is used as input and passed through Rapid Automatic Keyword Extraction (RAKE) algorithm for identification of top keywords in a sentence. The top keywords are then matched with historical data from the test plan repository. The ATG Intelligent Mapper 310 identifies matching keywords from the historical data from the test plan repository to a particular test plan and the steps of that particular test plan. The ATG Intelligent Mapper 310 then analyzes for reusable components and temporarily stores the top twenty reusable components in the intelligent mapper database 312.

The RAKE algorithm is a domain independent keyword extraction algorithm for determination of key phrases in a body or set of text. The RAKE algorithm analyzes a frequency of a word or a particular grouping of letters and its parallel occurrence with other words. In other words, the algorithm may use a list of stop-words and phrase delimiters (e.g. the, is, are, that, etc.) for detecting the most relevant words or phrases in a particular body or set of text. The texts may be split into a list of words, for example, one list for the test plans and another for the test steps, or lists of test steps for each test plan. Stop-words and phrase delimiters for a particular list may be removed so that the words remaining in the particular list are content words (e.g. return, run durable, etc.). A matrix of word occurrences may be provided for analyzing the top keywords.

In other embodiments, other keyword extraction methods may be used. Examples of these include graph-based methods, graph-based methods for extracting key phrases of topics, unsupervised extraction using sentence embedding for sets of data in real-time, word-net-based pattern evaluation, and text mining applications. For example, another search comprises a search on a shared repository comprising stored revisions for multiple branches that share storage of their revisions. This may be beneficial to various departments within an organization or various teams among organizations to share repositories comprising files and directories. The shared repository may require permissions for sharing or editing particular files. Accordingly, the ATG Intelligent Mapper 310 may temporarily store the top results from the search for suggesting reusable components.

In one embodiment, the tag learning 318 may be employed to a search by assigning a keyword or a term to an image, a test step, or data from the repository. This metadata may describe the item tagged for facilitating a particular search of particular patterns. Tags may comprise tag attributes comprising a name and a value. A user or a group of users may name tags and a tag may be selected from a controlled vocabulary set by the user or the group of users. The structure of the tags may comprise hierarchical (e.g. a single hierarchical tree), non-hierarchical, or a combination of both. For example, tagging may comprise combining hierarchical and non-hierarchical tagging to assist in information retrieval. In some embodiments, the tag learning 318 may comprise an automatically generated cross-reference tag, such as tags tables or smart tags.

At 320, ATG Rules Engine has many capabilities. For example, ATG Rules Engine 320 may parameterize test data. One embodiment includes creating a new JavaScript Object Notation (JSON) file and externalizing all data inputs used during a test plan execution. Another embodiment includes using Excel files and Apache POI API and externalizing all data inputs used during a test plan execution. Yet another embodiment includes having identified data in XML and externalizing all data inputs used during a test plan execution. Parameterization is powerful and efficient for test designing automation tools and allows for the replacement of hard-coded input data with various sets of data that may be stored in tables, arrays, Excel sheets, and so forth. Parameterization provides agility and flexibility for testing processes and additionally enhances ease and speed.

Another capability of the ATG Rules Engine 320 is handling Static Code Analysis (SCA) rules. SCA rules are performed based on organization and industry standards (e.g. MISRA and ISO 26262) through rule sets. The ATG Rules Engine 320 is capable of taking code related rules and integrating them as part of a final outcome to avoid non-compliance with SCA rules for particular organization or industry standards. One advantage of handling SCA rules is that it reveals errors in code earlier, rather than years after the release of the code to public users who may or may not be developers. Another advantage of handling SCA rules is that it reduces time for developers who manually review code. The ATG Rules Engine 320 may analyze code in-depth.

Another capability of the ATG Rules Engine 320 is basic validation. After each test step, the ATG Rules Engine 320 validates results. Validation testing ensures whether a client's needs are met. The validation process may comprise a system description, environment specifications, limitations, testing criteria, acceptance criteria, identification of a validation team, identification of responsibilities of the validation team or individuals, required documentation, assumptions, and required procedures. The validation process may further comprise infrastructure requirements (e.g. equipment needed) and functional requirements (e.g. performance requirements security requirements, user interface, operating environment, etc.) of the system. The ATG Rules Engine 320 may run a gap analysis to determine gaps between the results and the requirements. Validation after each test step ensures low and medium complex validations are handled through the ATG.

Another capability of the ATG Rules Engine 320 is adding loggers for steps, actions, success, failure, etc. The ATG Rules Engine 320 may include various levels of logs and logs in multiple forms. One logger may include an all logger capable of turning all logging on. Other loggers may include a debug logger for debugging information, an information logger for highlighting the progress of an application, a warn logger for designating potential harms, an error logger that indicates errors that do not prevent the application from running, a fatal logger for designating sever errors that crash the application, and an off logger for turning all loggers off. The ATG Rules Engine 320 is capable of adding loggers at regular intervals in a final script. The capability of the ATG Rules Engine 320 to add loggers improves troubleshooting.

Another capability of the ATG Rules Engine 320 is exception handling. In other words, the ATG Rules Engine 320 has capability to catch exceptions and take actions to block and handle any caught exception. The ATG Rules Engine 320 may use Try-Catch blocks for handling exceptions. A single try block may be associated with multiple catch blocks. The corresponding catch blocks may each execute for different specific types of exceptions. A generic exception reusable component capable of handling all exceptions may follow one or more catch exceptions in a Try-Catch block.

Another capability of the ATG Rules Engine 320 is customizing rules for automation script commands. Depending on available libraries, industry requirements, or product specifications, the ATG Rules Engine 320 may customize automation script language accordingly. As one example, the ATG Rules Engine 320 may customize the automation script language to Python for data from Selenium or Appium libraries or to Java for data from Selenium libraries. The flexibility to customize automations script languages enhances functionality. For example, using different languages to script code results in apparent differences between the languages as time passes. Customization of script language may reduce redundancy in a script language and prevent resulting differences across multiple languages.

Another capability of the ATG Rules Engine 320 is integration of clean-up utility. Clean-up utility may include cleaning up after test and error handling or cleaning up a system under test for previously executed tests. In one embodiment, each team within a department or across multiple departments creates their own common clean-up utility for consumption by every script. This would allow each team to account for post-testing activities that include archiving code or archiving data used during a test. Clean-up utility may comprise a reset data input parameters to initial conditions, clearing logger files, or an update of a library to a new version.

Another capability of the ATG Rules Engine 320 is defining global properties. For example, properties may be customarily defined for use by a specific application based on the behavior of the specific application. Configuration testing of the specific application may include running a functional test suite across multiple software configurations for verification of desired functionality without flaw or error. Configuration testing allows for analysis of an optimal system performance without an encounter of compatibility issues. Accordingly, the ATG Rules Engine 320 is useful for the customization of properties for a specific application.

Another capability of the ATG Rules Engine 320 is evidence capturing. ATG Rules Engine 320 is capable of capturing evidence for traceability, for example, by determinations based on a manual script description. Traceability of software is an important factor for supporting activities in development of the software. Traceability helps to improve software system quality by, for example, supporting implication analysis, maintaining the system, identifying and comparing requirements of new or existing systems for analysis of reusable software components, inspecting components and the system, and integrating changes in a software system. Completeness of a relationship between repository data and test steps may be determined by comparisons of baseline documents. Additionally, evidence capture for traceability may comprise using a tabular representation of data in the repository or test plans. Traceability may vary by testing condition or mapping requirement. In some embodiments, scripts may be mapped to a traceability matrix using script names.

Another capability of the ATG Rules Engine 320 is creating an automation project suite. For example, the ATG Rules Engine 320 may create a workspace for generating script. Creating repositories and workspaces for storing script files and resulting log files for organizing test projects are useful for user functionality and for sharing with team members, other teams, etc. The automation project suite allows users to store scripts and assets in named repositories, establish consistent repository naming schemes, and manage repositories (e.g. rename, move, delete, expand, etc.). For example, creating a script project may comprise expanding a group node for selection of a script or asset to create involving a functional testing group and a general group, each with various script types. The ATG Rules Engine 320 may extend relative functionality and modify data sets in workspaces, such as developing scripts to populate fields, generate custom reports, or reformat data.

Another capability of the ATG Rules Engine 320 is a pause and play feature. The ATG Rules Engine 320 allows a user to save work and resume when needed, providing a user to take break while scripting. This features improves efficiency of scripting by fully utilizing work time without weekend or holiday interference. Pausing may be indefinite or for a specified or predetermined amount of time. A default may be set for the pausing feature. Pausing may also be useful for debugging scripts for viewing a value in a field at various points in a script or to evaluate the progress of the script. Pausing may be available for multiple scripts for viewing multiple points in various scripts.

Another capability of the ATG Rules Engine 320 is meaningful image naming, such as using OCR reading on an image and renaming to an OCR value. OCR engines may be trained incrementally and trained for new languages and fonts. Additionally, training data may comprise intermediate files for combining into a single file. A graphical user interface approach may allow for non-technical users to train the OCR engines. Training of the OCR engines may be validated using historical data from a test plan repository. Accordingly, meaningful image naming improves processing of information by adapting the image information for recognizable OCR readings.

Another capability of the ATG Rules Engine 320 is suggesting reusable components for test steps. In one embodiment, an elastic search may be performed and a reusable component for use in each test step may be predicted. Any of the various searches performed by the ATG Intelligent Mapper 310, as described in more detail above, may be used to predict a reusable component for use in each test step of a test plan. Suggested or predicted reusable components may be provided or displayed to an end user in Git Link, for example, or in a free text search without using tools outside of the ATG. The reusable component may be dynamically created and a user may select specific reusable components for creation or an automatic selection of reusable components may be selected according to predetermined rules. Selection of a reusable component may depend upon the particular test steps to be performed. In another embodiment, a search, as described above for the ATG Intelligent Mapper 310, may be performed and a reusable component for use in each test step validation may be predicted.

Another capability of the ATG Rules Engine 320 is providing links to reusable components for easy navigation. For example, the ATG Rules Engine 320 may provide links (e.g. Git Link) to source code of the reusable components that assist with navigation. The link may navigate to a specific line or range of lines of the source code. The link may provide a portion of the relevant source code. In some embodiments, a user may need certain credentials to access a specific link to source code.

Another capability of the ATG Rules Engine 320 is duplicate image clean-up. For example, the ATG Rules Engine 320 may use pixel comparisons to identify duplicate images in a workspace and discard the duplicates. The ATG Rules Engine 320 may detect images with the same subject, topic or category and may resize or edit images. The ATG Rules Engine 320 may detect duplicate images in various formats, including JPG, PNG, GIP, RAW, TIFF, PSD, etc. A default may consist of a user verifying the image is a duplicate before discarding the duplicate if the pixel comparison results fall within a pre-determined range below a threshold. The ATG Rules Engine 320 may backup image files prior to discarding. The ATG Rules Engine 320 may undo changes and restore files upon a review of the discarding. The ATG Rules Engine 320 may use a comparison algorithm that considers file names, file sizes, dates of modification, and versions before and after modification.

Turning now to 322, Final Automation Script 322 is generated. As depicted in FIG. 3, a download script window is displayed. A user may view the file system location on the download script window. The Final Automation Script 322 may be generated after a user has selected reusable components for test steps or reusable components for test validation. The Final Automation Script 322 may be generated after the creation of a reusable component after completion of test steps. The Final Automation Script 322 comprises at least one reusable component and may further comprise launch points that define a script's execution context, source code written in a supported language, and variables with binding values that determine how information is passed or received by a script. The Final Automation Script 322 may comprise multiple reusable components for further automatic and consistent scripting. The Final Automation Script 322 reduces the time needed to review scripts and increases efficiency gains.

The at least one reusable component of the Final Automation Script 322 has many applicable embodiments. For example, the at least one reusable component may be reusable for various scripting practice standards across multiple teams. To illustrate, there may be a common pattern of automation coding practices followed across the multiple teams permitting reuse of the at least one reusable component. Another illustration includes the at least one reusable component achieving accelerated test automation scripting while additionally following a defined best practice. Another includes the at least one reusable component achieving a shift left approach for SCA warnings (moving tasks to left at early point in lifecycle and early testing during development).

Figure 4:
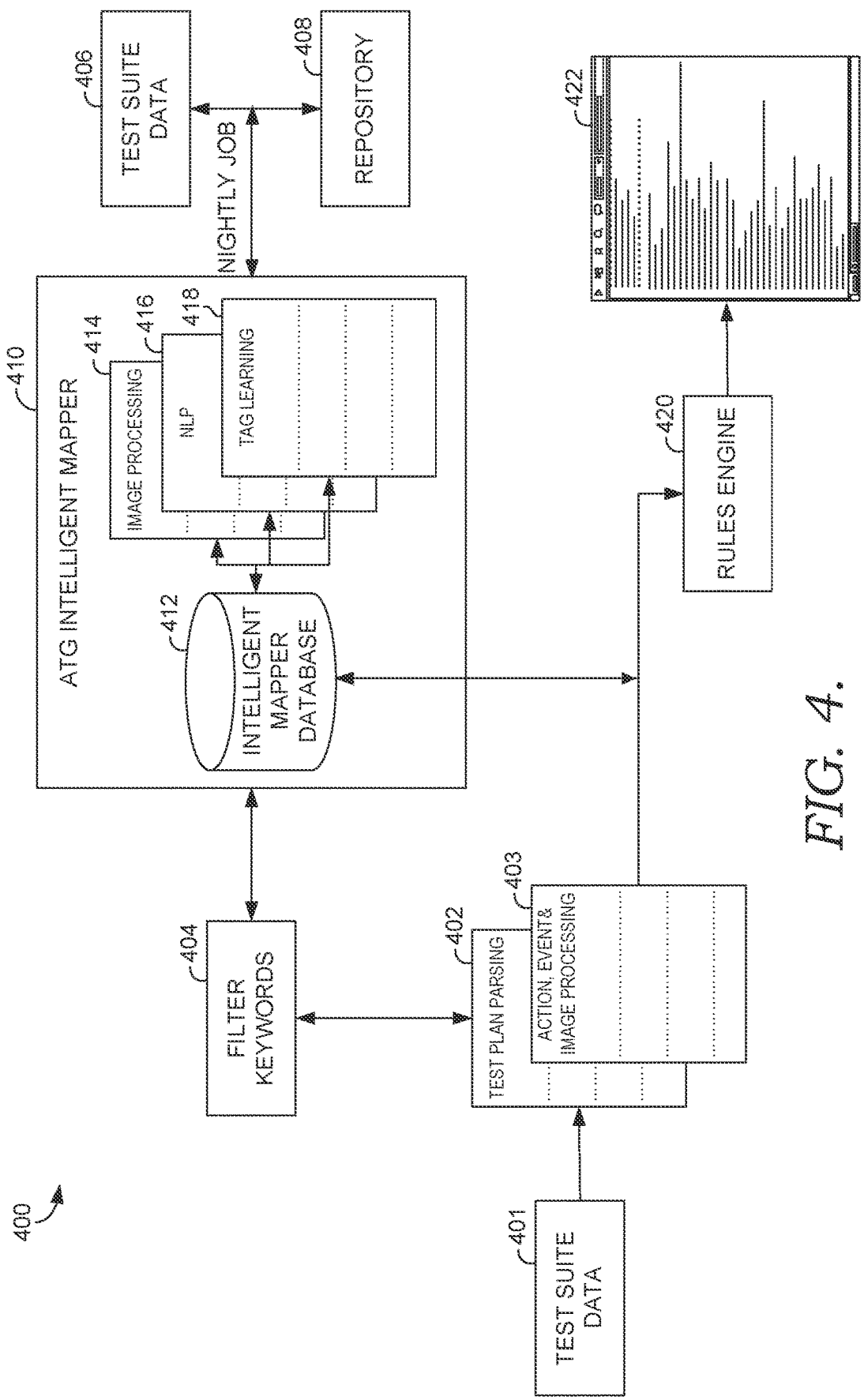
FIG. 4 is another architecture for generating an automation script, according to one embodiment.

Turning to FIG. 4, example architecture 400 for generating an automation script is illustrated. At step 401, test suite data is retrieved. Test suite data may comprise a collection of test plans. At step 402, test plans are parsed. Parsing may include syntax analysis or syntactic analysis of metadata, repository data, test steps, etc. in natural language, data structures, or computer language. Additionally, parsing may comprise removal of HTML tags, replacement of variables, replacement of internal or external links, format adjustments, parsing file names for embedded metadata, etc. Afterwards, the parsed data may proceed to step 404 for a filter of keywords or to 420 rules engine. At step 403, test suite data comprising actions, events, and images are processed. Afterwards, the processed data may proceed to step 404 for a filter of keywords or to 420 rules engine.

At step 404, examples of keyword filtration may involve using a RAKE algorithm for identifying top keywords in a grouping of words or letters. In some embodiments, a particular weight is assigned to teach word and those with the greatest weights are identified as the top keywords. In some embodiments, a numerical statistic reflecting the importance of a word in a particular set or group of words is determined by weighing from a search of informal retrieval, text mining, or user modeling. The numerical statistic may increase proportionally to a number of times a word appears in the set or group. Keyword filtration may involve NLP and a statistical method (involving word counts and co-occurrences), NLP and a symbolic method (involving semantic information), or a combination. Keyword filtration may involve a rule-learning algorithm with strict rules gradually relaxed as other, similar sets or groups of words are analyzed.

Following step 402, 403, or 404, data is stored in the Intelligent Mapper Database 412 of the ATG Intelligent Mapper 410. Data from the ATG Intelligent Mapper 410 additionally stores test suite data 406 in a separate repository 408 (e.g. for backup) at set or predetermined intervals of time (e.g. overnight). The ATG Intelligent Mapper 410 has Image Processing 414, NLP 416, and Tag Learning 418. Image Processing 414 includes identifying script and using OCR. Image processing allows for execution of image enhancement or transformation of monochrome, color, or grayscale images. A neural network layer on an image processor may load three-dimensional block image data for processing of image data. The pixel values may be organized in an array. Images in motion may be processed in a sequence of frames.

Further, NLP 416 may be configured to mine and scan text within a test plan or other data in a repository. Files comprising test plans and test steps may be scanned or mined for word and sentence relationships or content tag relationships. NLP 416 may detect keywords in test steps across multiple test plans stored in the repository, wherein the keywords have similar grammatical roles (e.g. all have the same suffix) or parts of speech (e.g. all adverbs). NLP 416 may decipher ambiguities in differing languages and may be combined with machine learning, wherein the machine learning is trained based on data from an electronic medical record comprising clinical records. Additionally, Tag Learning 418 may be configured to train classifiers associated with a set of tags for textual metadata of videos, images, motion images, or other files. Classifiers may comprise a plurality of subtag classifiers. Tag Learning 418 involves creating tags that more accurately label the relevant data. Accordingly, Tag Learning 418 provides the ATG Intelligent Mapper 410 with more efficient search capabilities.

Data from the ATG Intelligent Mapper 410 is then received by the Rules Engine 420. The Rules Engine 420 has, but is not limited to, the following capabilities: test data parameterization, handling of SCA rules, validation after each test step, addition of loggers, exception handling, modification of automation scripting language, integration of clean-up utilities, configuring global properties for use by one application based on behavior of the one application, evidence capture for traceability, creating automation project suites, pause and play feature for resumption of script generation, meaningful image naming, reusable component suggestions for test steps, reusable component suggestions for test validation, links to reusable components for source code, and duplicate image clean-up. Lastly, the Final Automation Script 422 is generated.

Figure 5:
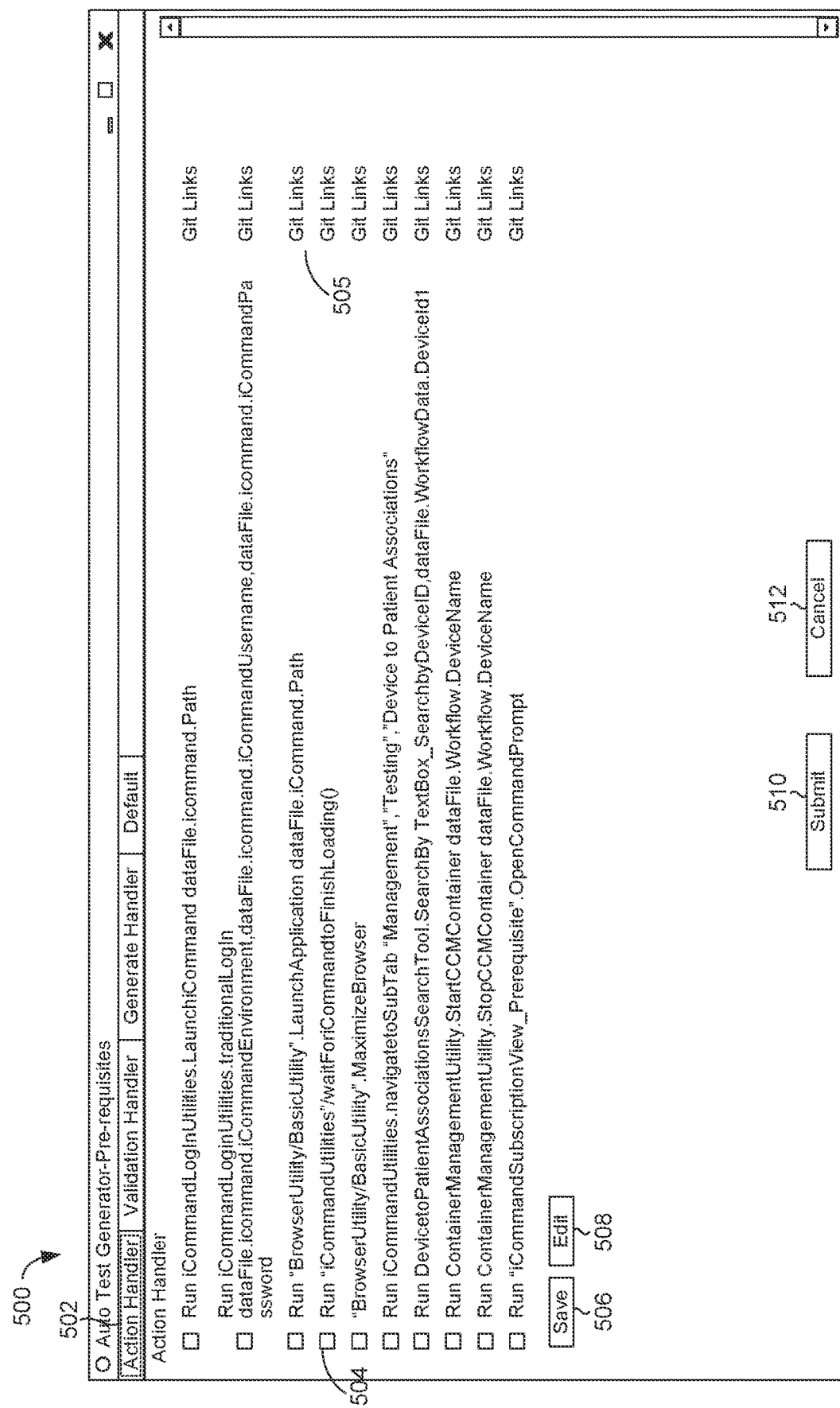
FIG. 5 is an action handler providing the top ten reusable component suggestions, according to one embodiment.

Turning to FIG. 5, window 500 presents a list of top ten reusable component suggestions to a user. Reusable component suggestions may be reused for test step validation or test steps in one or more test plans. Reusable components that are selected from the list of suggestions are used for generation of a final automation test script. Action Handler 502 describes how commands are to be executed. The list of reusable component selections provides individual descriptions for commands and the corresponding box 504 is selected, that reusable component will be used for the final automation test script generation. One or more reusable components may be selected at 504. At 505, Git Links are provided for more information on the description for commands. Once selections are made, a user may save at 506 and reedit selections at 508 before submitting at 510 or canceling at 512. Saving at 506 may be selected after generation of an action pattern (e.g. eggPlant Turbo Capture Session to capture images, actions, and events for drafting scripts), if the action pattern is needed for a particular step.

Turning to FIG. 6, window 600 presents test plan details from various test plans after an API call to fetch those details. At 602, inputs from test plans from several teams were taken into consideration for initial project analysis. At 604 similar images were detected among the test plans. At 606, the path of the similar images is OCR or hash code. At 608, OCR Text Match comprises a configuration, a driver container, a copy from a clipboard, a custom component, a domain, an environment, a fetched user name or password from an iBus, FIN NBR, a full screen, and a flowsheet. At 610, OCR Input Text comprises a configuration, a container, a copy from a clipboard, a custom component, a domain, an environment, a user name, FIN NRR', a flowsheet, and a full screen. In one embodiment, an OCR engine (e.g. Tesseract OCR) is used for both input file at 602 and OCR Input Text 610.

Turning to FIG. 7, window 700 presents a final automation script, according to one embodiment. Data capturing the date and time the final automation script was generated along with server information is saved in a repository along with evidence to the capturing of the final automation script generation. The final automation script may comprise Type-Text instructions, Click instructions, and other information corresponding to test steps. The final automation script may be written in many different programming languages (e.g. JavaScript) and comprises reusable components for test steps or test step validation. The final automation script may be opened in an eggPlant output suite for analysis of gap performance.

Figure 8:
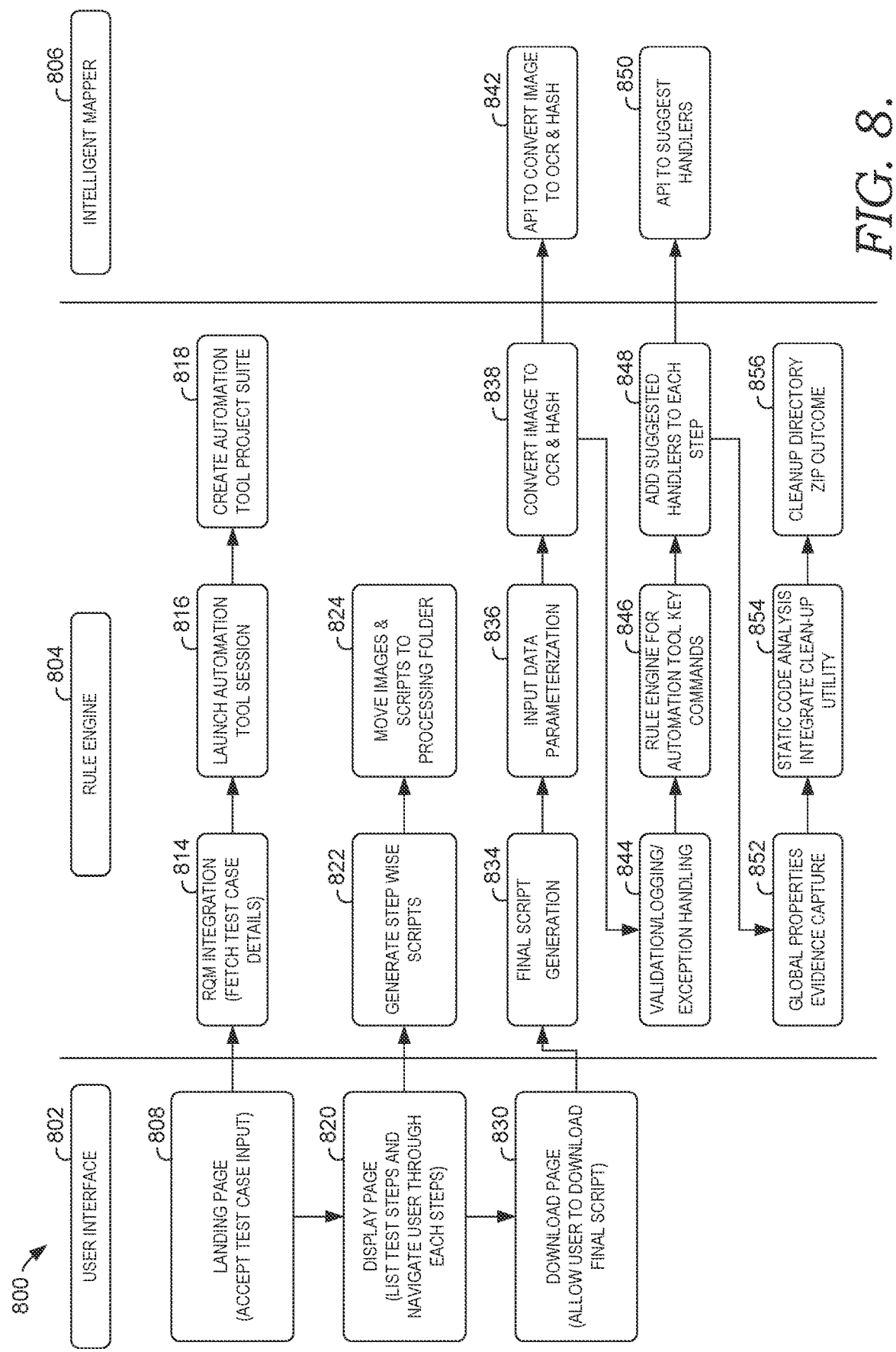
FIG. 8 is a flow diagram illustrating application from a user interface to a rule engine to an intelligent mapper, according to one embodiment.

Turning to FIG. 8, flow diagram 800 illustrates application from a user interface to a rule engine to an intelligent mapper, according to one embodiment. Flow diagram 800 comprises three columns: user interface 802, rule engine 804, and intelligent mapper 806. At step 808, a user may accept test case input at a landing page. At step 814, test case details are fetched. For example, details of a test case may be downloaded from a test management tool, such as RQM, for initiating scripting continuing from the details downloaded from a test management tool, such as RQM. At step 816, ATG automation tool session is launched. The ATG automation tool should be updated and it should display test case steps and corresponding details. At step 818, automation tool project suite comprising repository with test plan and test steps is created. At step 820, at the user interface, a list of test steps is displayed and a user may navigate through each of the test steps. At step 822, the rule engine 804 may generate step-wise scripts and subsequently at step 824 the rule engine 804 may move images and scripts to a processing folder. At step 830, at the user interface, a download page permits the user to download the final script. At step 834, the rule engine generates a final script and at step 836 the rule engine inputs data parameterization. At step 838, the rule engine 804 converts images from the repository into OCR and hash code. At step 842, the intelligent mapper 806 uses an API call to convert the image into OCR and hash code. At step 844, the rule engine 804 adds loggers, validates test steps, and perform exception handling. At step 846, the rule engine 804 performs commands using the automation tool key. At step 848, the rule engine 804 adds suggested reusable component to each test step. At step 850, API calls are used to suggest handlers via the intelligent mapper 806. At step 852, global properties for use by one application based on behavior of the one application are configured. Evidence is captured for ensure proper configuration of the global properties (e.g. screen shots). At step 854, static code analysis is performed at the rule engine 804 and a clean-up utility is integrated. At step 856, the rule engine 804 performs a clean-up directory for a zip outcome.

Figure 9:
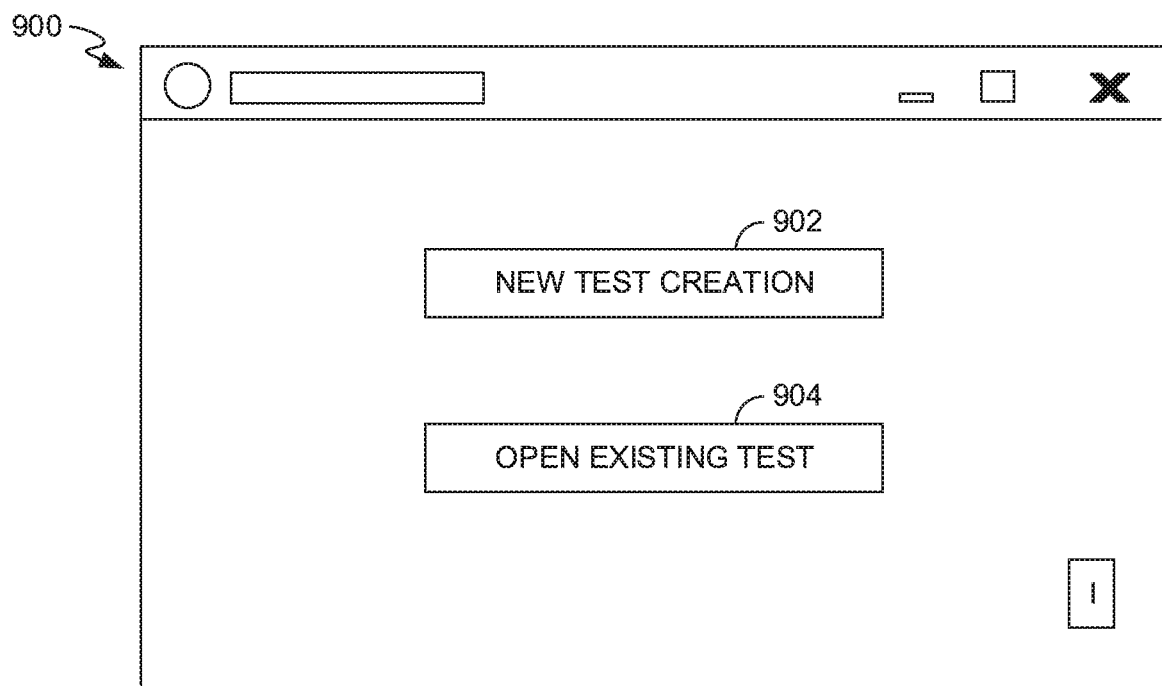
FIG. 9 comprises a screenshot of the auto test generator from a user's perspective, according to one embodiment.
Figure 10:
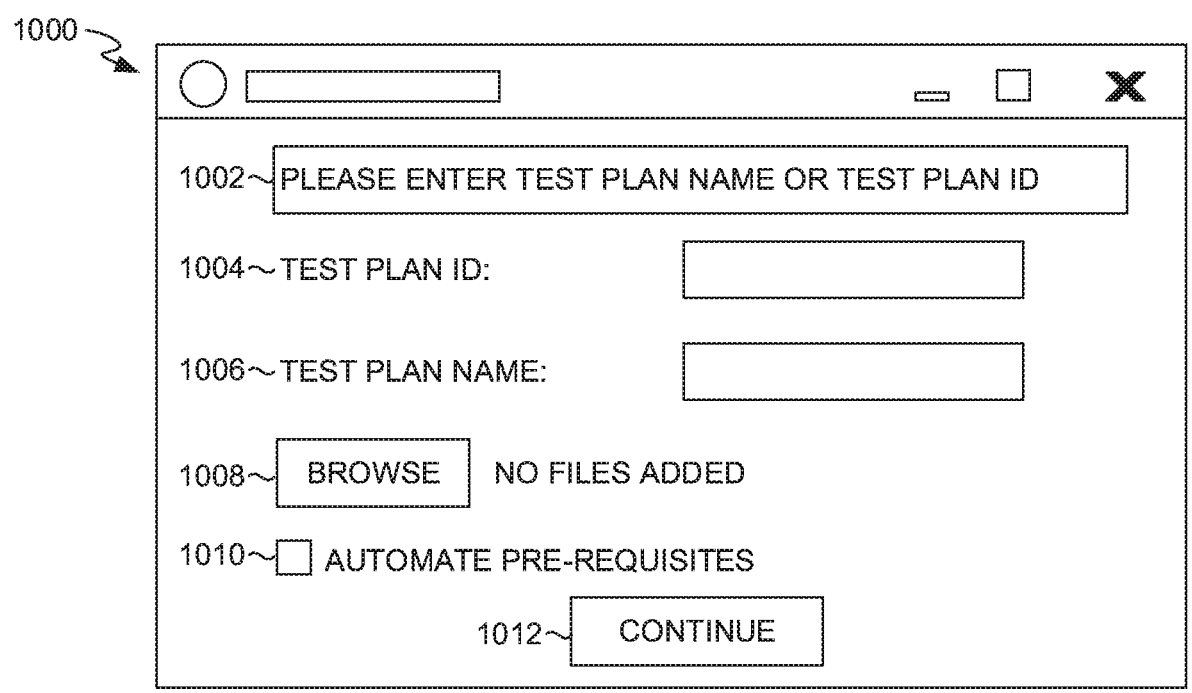
FIG. 10 comprises a screenshot of the auto test generator from a user's perspective, according to one embodiment.

Turning to FIG. 9, screenshot 900 illustrates the ATG from a user's perspective, according to one embodiment. A user will select to either create a new test at 902 or to open an existing test at 904. In embodiments, the selection may be automatic depending upon predetermined rules. Turning to FIG. 10, screenshot 1000 illustrates the ATG from the user's perspective. At 1002, a user is prompted to enter test plan name or test plan ID. The user would enter the test plan ID at 1004 and the test plan name at 1006. If a user does not know the name or ID, the user could browse at 1008. At 1010, a user could select to automate pre-requisites. Afterwards, a user would continue at 1012.

Figure 11:
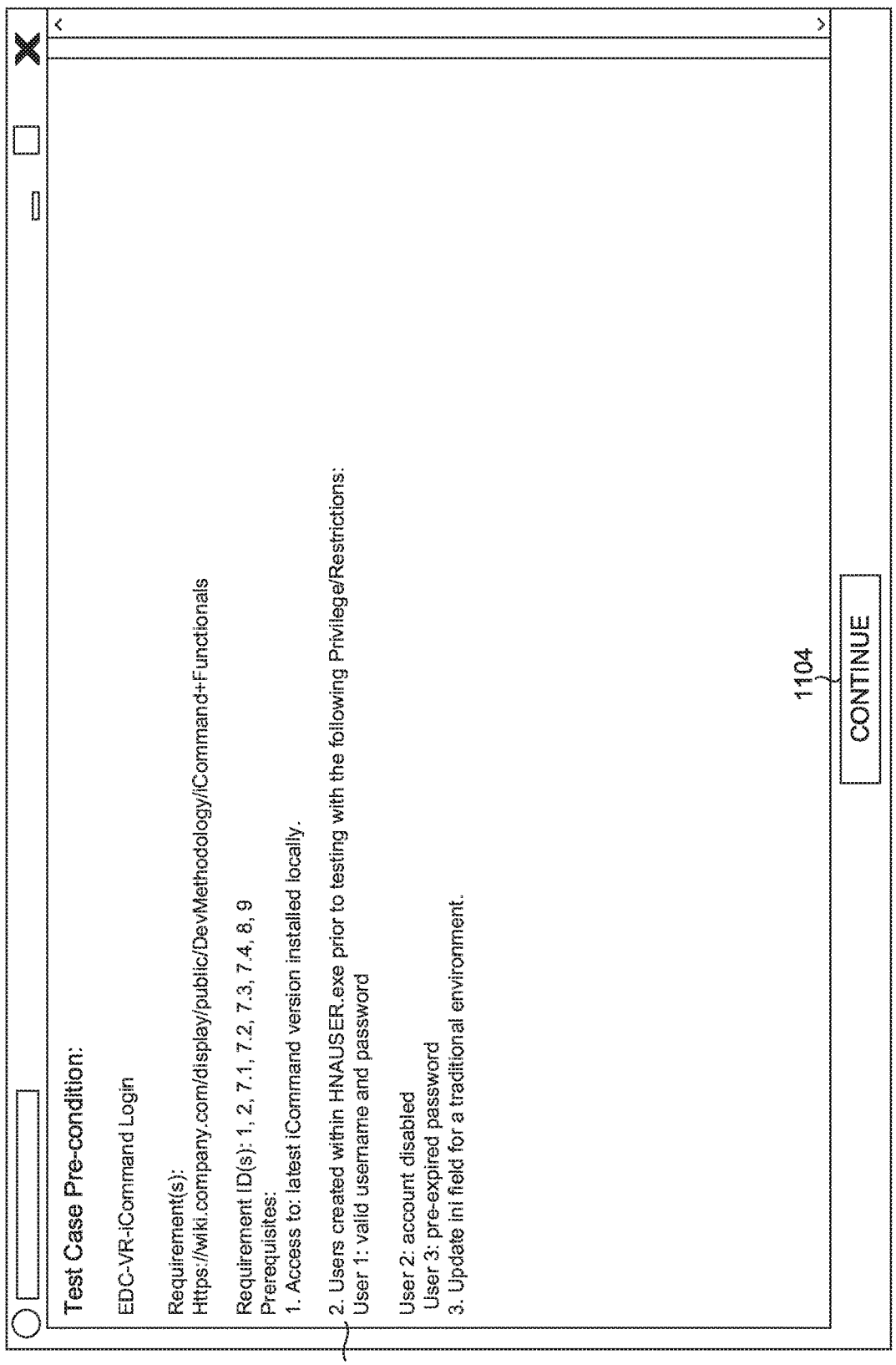
FIG. 11 is a screenshot of test case pre-conditions, according to one embodiment.

Turning to FIG. 11, screenshot 1100 illustrates test case pre-conditions, according to one embodiment. In one embodiment, a pre-condition involves installing an eggPlant tool with an active system under test connection. Continuing the example, the ATG is also installed in the system where the eggPlant is installed and the ATG configuration is updated. A validated test case and a validated test script is already in the system, ready for automation. In another embodiment, the pre-conditions involve installing iCommand locally. At 1102, example privileges and restrictions corresponding to pre-conditions are depicted. At 1104, a user may continue and proceed to the following steps. Automation of the pre-conditions save users and developers time, thus making the ATG a more efficient tool.

Figure 13:
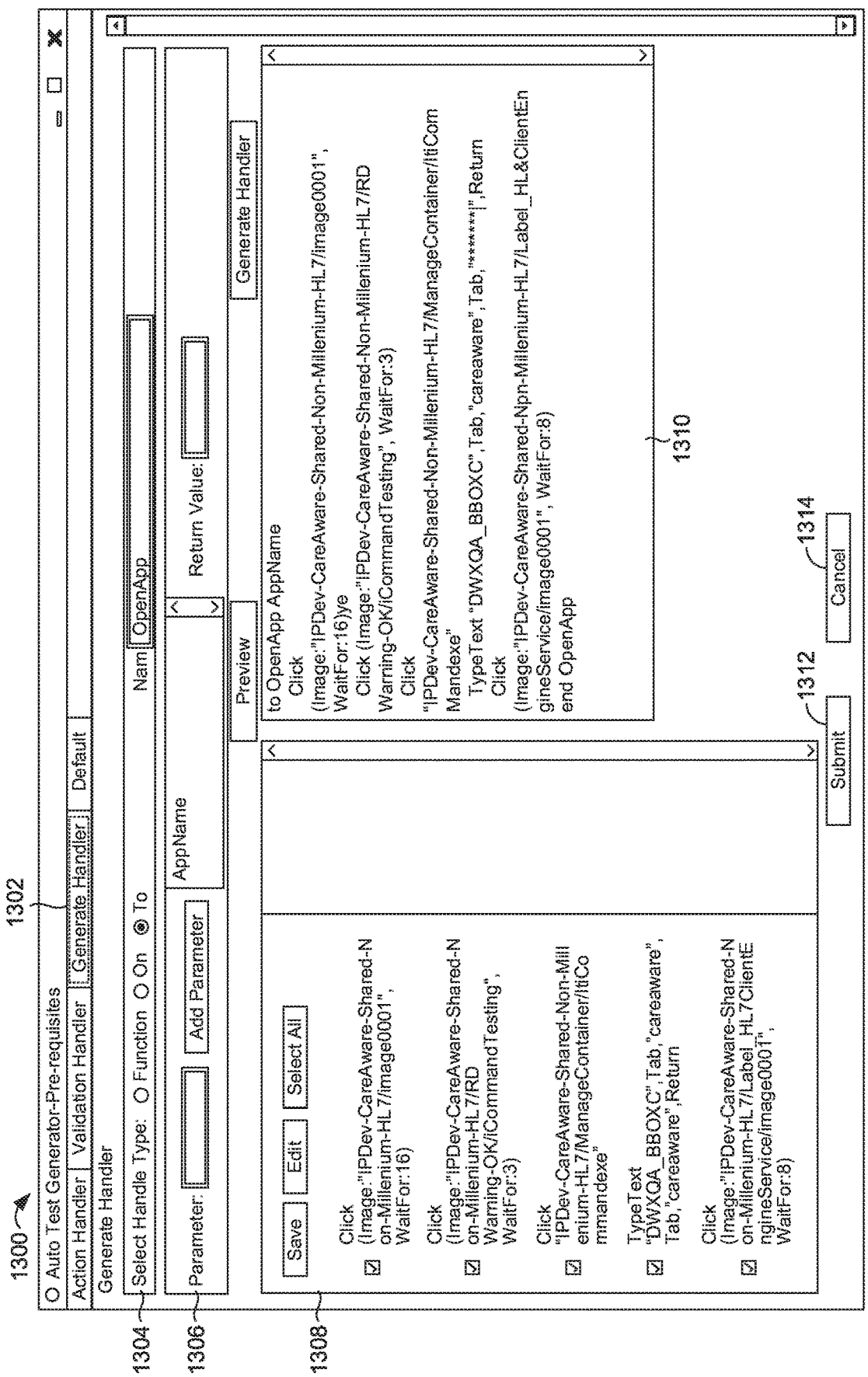
FIG. 13 is a screenshot of generating a new handler using the ATG, according to one embodiment.

Turning now to FIG. 12, screenshot 1200 depicts validation handler 1202 with two selected recommended reusable scripts for validating test scripts at 1204. Git Links corresponding to the recommended scripts are provided for further detail. A user may save 1206 or further edit 1208 and may submit 1210 or cancel 1212 the work for the validation handler. Turning now to FIG. 13, screenshot 1300 depicts a generate handler at 1302. At 1304, the user may select handler type, such as "function," "on," or "to." At 1306, a user may add a parameter and save, edit, or select all at 1308. Selections made at 1308 may be previewed at 1310. Other changes to the handler include replacing actual values with parameters, selecting additional code lines, and so forth. Users may verify the handler generation is successful and confirmation is displayed. Lastly, user may submit 1312 or cancel 1314.

Figure 14:
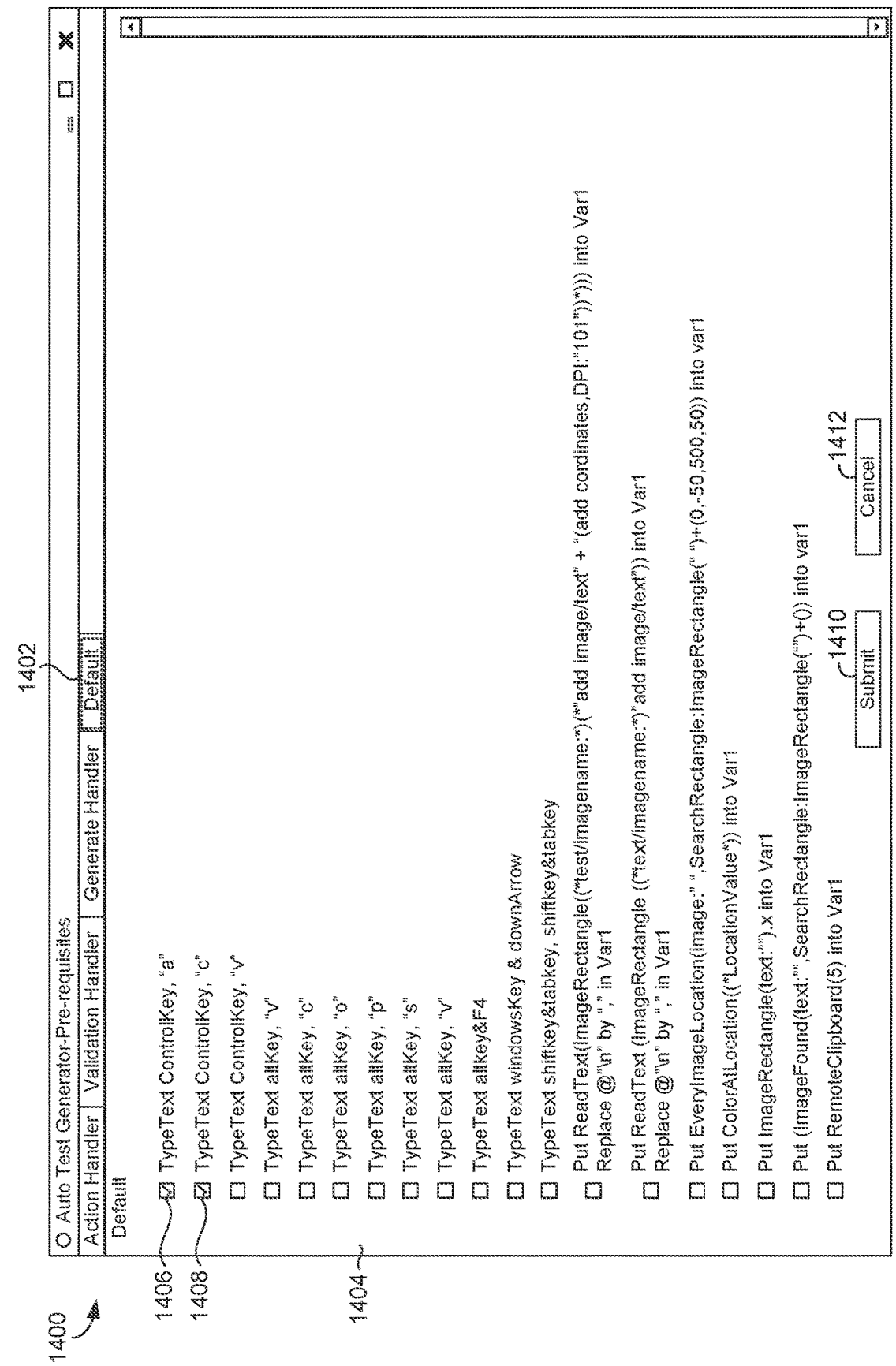
FIG. 14 is a screenshot of default selections, according to one embodiment.
Figure 15:
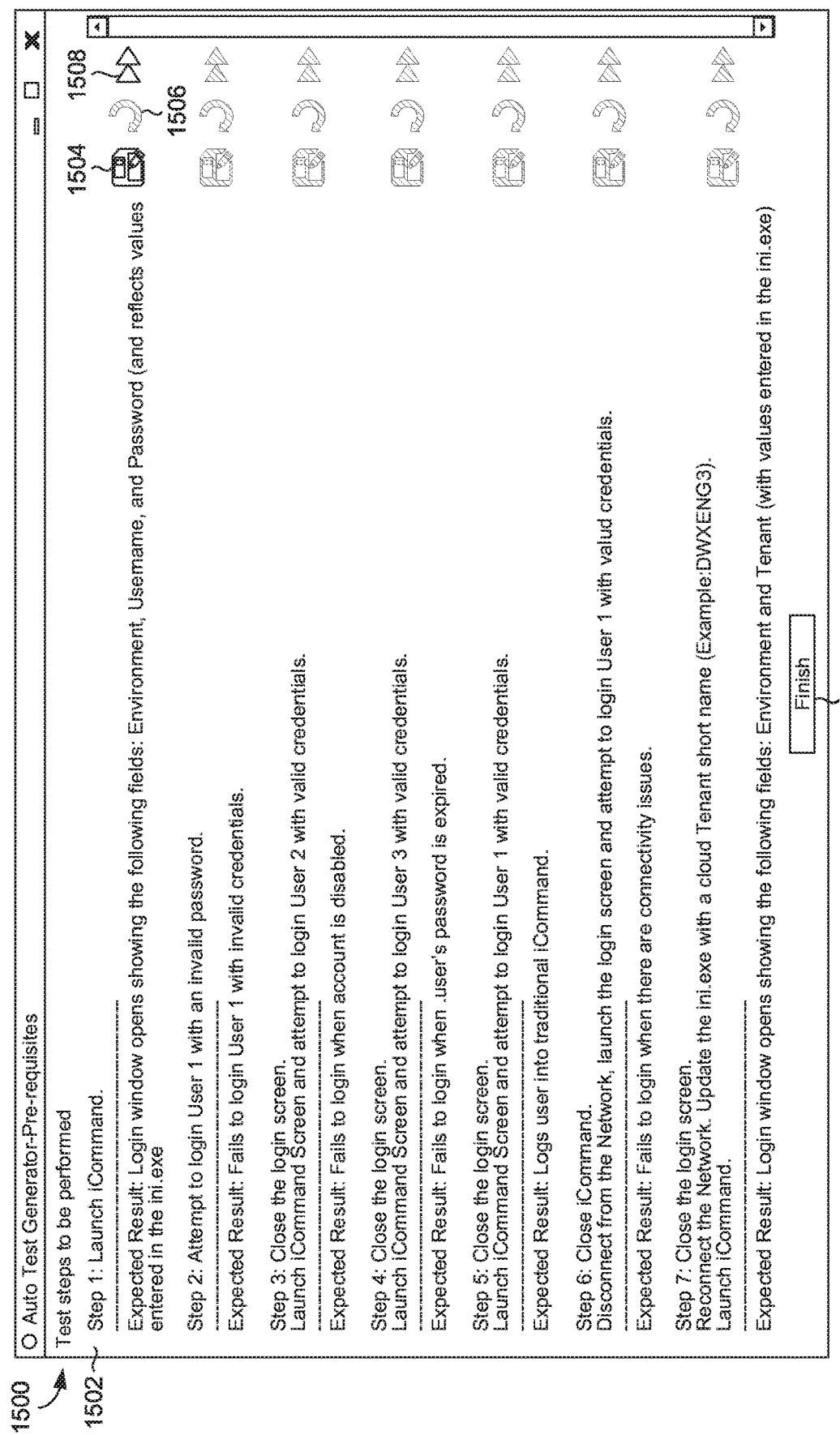
FIG. 15 is a screenshot of steps to be performed by the ATG, according to one embodiment.

Turning to FIG. 14, screenshot 1400 illustrates a customizable default 1402 for the handlers. According to the present example embodiment, of the various selections 1404, a user has selected 1406 and 1408. With these selections, the user may submit 1410 or cancel 1412. Turning to FIG. 15, screenshot 1500 comprises steps 1502 to be performed by the ATG. Each test step may be saved 1504 so that a user may return to scripting at a later time. Each test step may additionally be rewound 1506 or fast-forward 1508 or skipped. After the steps are complete, the user may finish 1510.

Turning to FIG. 16, screenshot 1600 illustrates script output. For example, at 1602 global properties for use by one application based on behavior of the one application may comprise default values for next key delay, a remote network interval, a standard image tolerance, a key down delay, a mouse click delay, a mouse double click delay, and a mouse drag speed. Additionally, pre-requisites at 1604 may comprise an iCommand login to a locally installed version of iCommand, a username and a password without a disabled account or an expired password, and an update for a traditional environment. Script output comprises list commands that may be displayed in a results tab of a script window, and script messages and errors may be written in log files.

Figure 17:
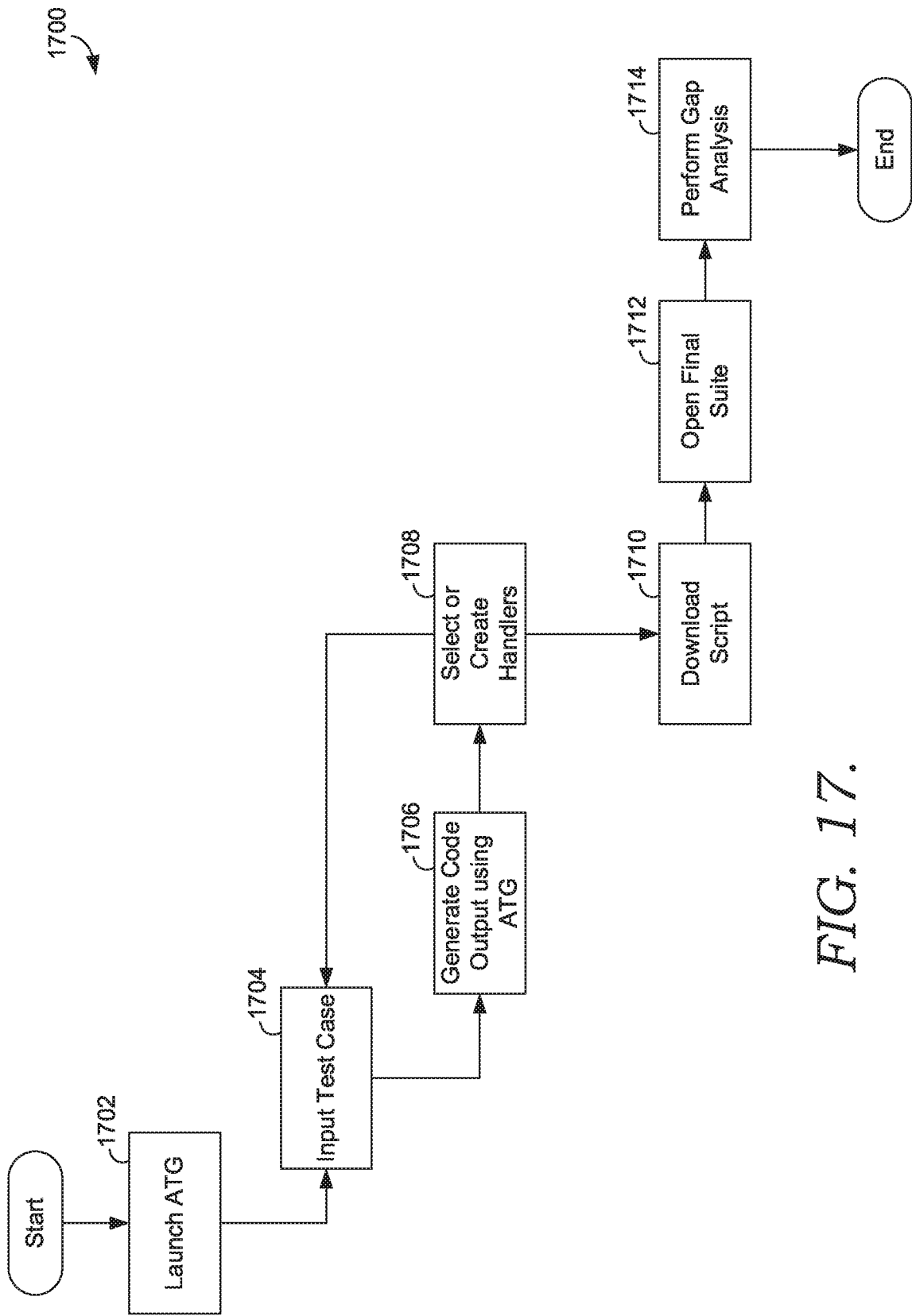
FIG. 17 is flow chart for generating code output using ATG, according to one embodiment.

Turning to FIG. 17, flow chart 1700 generates code output using ATG. At 1702, a user may launch the ATG. At 1704, a test case may be selected for input into the ATG. At 1706, output code is generated using the ATG. At step 1708, handlers (e.g. validation handler) are created and either more test cases are input into the ATG at 1704 or a script is downloaded at 1710. After 1710, a user may open the final test case suite at 1712 and perform gap analysis for assessing the performance of the final test case suite at 1714. Gap analysis will underscore the missing links in the final test case suite and allow for further improvement to reduce the gap.

Figure 18:
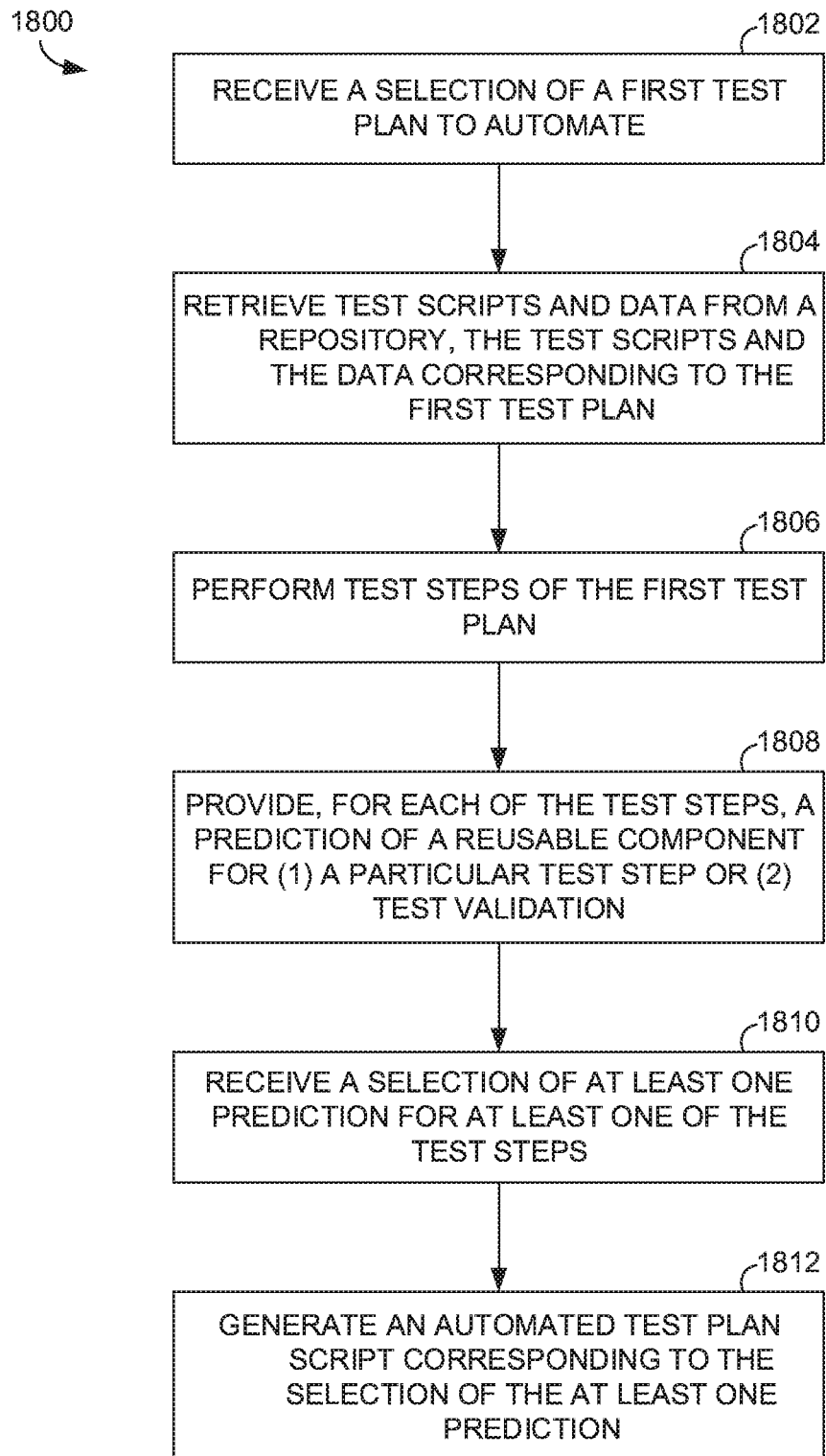
FIG. 18 is a flow chart for generating an automated test plan script corresponding to a selection of at least one prediction, according to one embodiment.

At FIG. 18, flow chart 1800 generates an automated test plan script corresponding to a selection of at least one prediction. At 1802, a selection of a first test plan for automation is received. At 1804, test scripts and data from a repository are retrieved. The test scripts and the data correspond to the first test plan. At 1806, the test steps of the first test plan are performed. At 1808, a prediction of a reusable component for a particular test step or test validation are provided. At 1810, a selection of at least one prediction for at least one of the test steps is received and at 1812 an automated test plan script corresponding to the selection of the at least one prediction is generated.

Further, a workspace in a testing framework may be created and an automation tool for performing and validating test steps of the first test plan may be launched. Upon completion of a first test step of the first test plan, an intermediate script may be generated. Additionally, a turbo capture session for a second test plan and generating action pattern from the turbo capture session may be launched, and a selection of the reusable component for test validation using the action pattern may be received. In response to the selection of the reusable component for test validation, a new reusable component using the action pattern may be created, and a second automation test plan script may be generated using the new handler. The user may be enabled to edit or review images corresponding to the second test plan and the user may be enabled to skip test steps of the second test plan.

Further, the ATG may enable a selection for providing the prediction as free text search without having to use a separate application. The ATG may also perform a search to provide the prediction, wherein the search comprises identifying keywords in a sentence and matching the keywords to historical data from a test plan repository. The ATG may also perform a search to provide the prediction, wherein the search comprises reading images and converting the images to optical character recognition (OCR) and hash code for identifying handlers for the prediction of the reusable component for the test validation. Continuing the example, the ATG may provide multiple predictions using the search, wherein all of the predictions of the reusable components for the test validation are displayed and the top twenty results are temporarily stored. Additionally, the ATG may enable a user to save scripting and enable the user to resume scripting.

Figure 19:
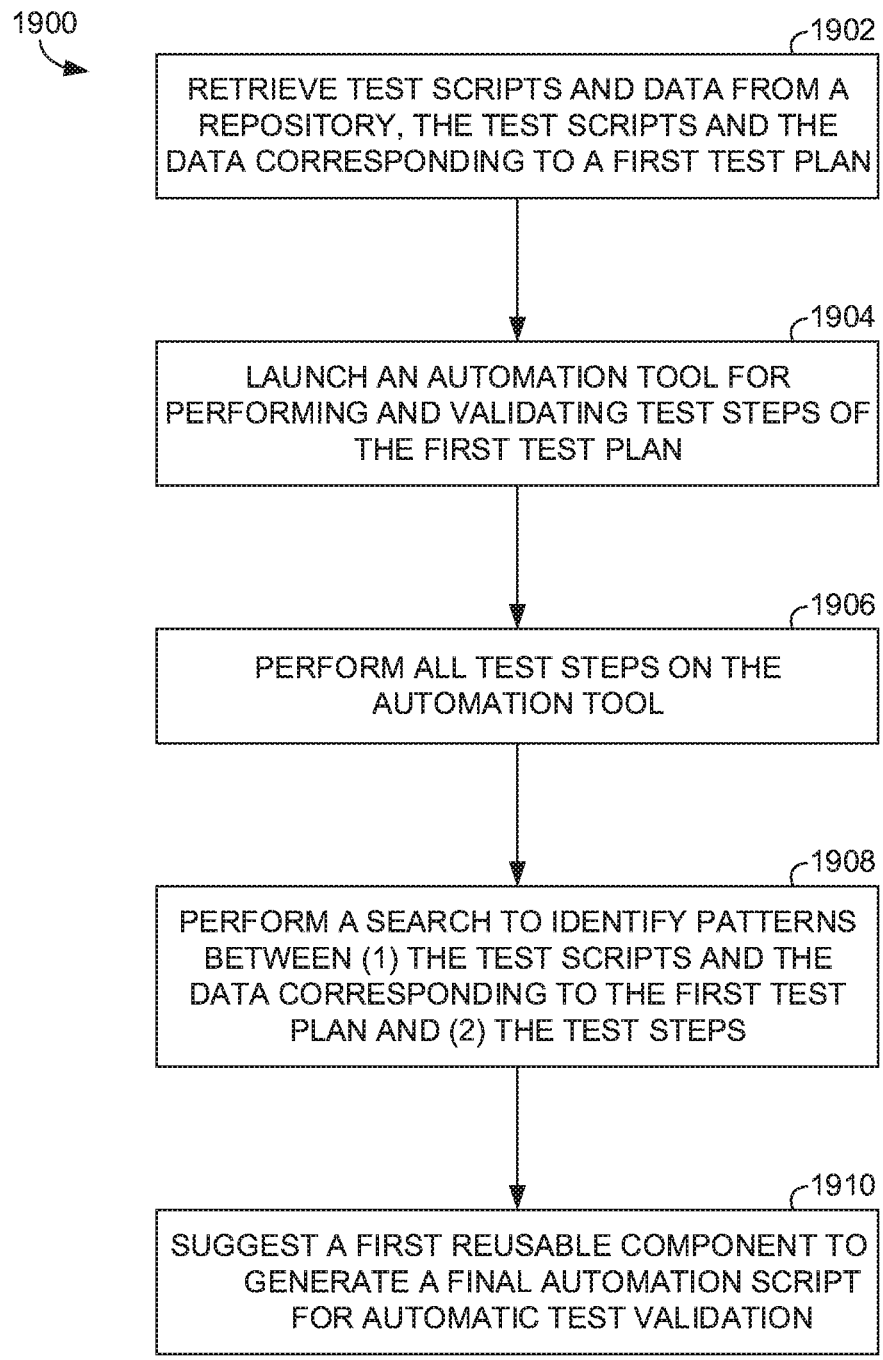
FIG. 19 is a flow chart for suggesting a first reusable component to generate a final automation script for automatic test validation, according to one embodiment.

Turning to FIG. 19, flow chart 1900 suggests a reusable component. At 1902, the ATG retrieves test scripts and data from a repository, the test scripts and the data corresponding to a first test plan. At 1904, the ATG launches an automation tool for performing and validating test steps of the first test plan. At 1906, the ATG performs all test steps on the automation tool. At 1908, the ATG performs a search to identify patterns between (1) the test scripts and the data corresponding to the first test plan and (2) the test steps. At 1910, the ATG suggests a first reusable component to generate a final automation script for automatic test validation.

Further, the automatic test validation is also usable for multiple test plans, and the first reusable component is also used to automatically populate all test steps of a second test plan. The ATG may also parameterize the data from the repository, wherein the repository is a script repository, a code repository, or a test tool repository. Continuing the example, the ATG may generate an intermediate script and identifying patterns between the intermediate script and the test steps for the suggesting the first reusable component, and integrate a common clean-up utility. The ATG may also use the first reusable component for test steps of a second test plan, then predict a second reusable component that can be used for each test step of the second test plan, and then predict a third reusable component that can be used for the validating the test steps. The ATG may also analyze code rules using static code analysis for suggesting a second reusable component to avoid particular rules.

Further, the ATG may also provide a selection to open an existing test already automated and located in a repository, prior to performing all the test steps. Continuing the example, the ATG may provide a selection to skip a new step, automate a pre-requisite using a prior automatic test validation, and automate the new step using the prior automatic test validation. The ATG may also read images using OCR and meaningfully renaming the images to an OCR value for performing the search to identify patterns.

Figure 20:
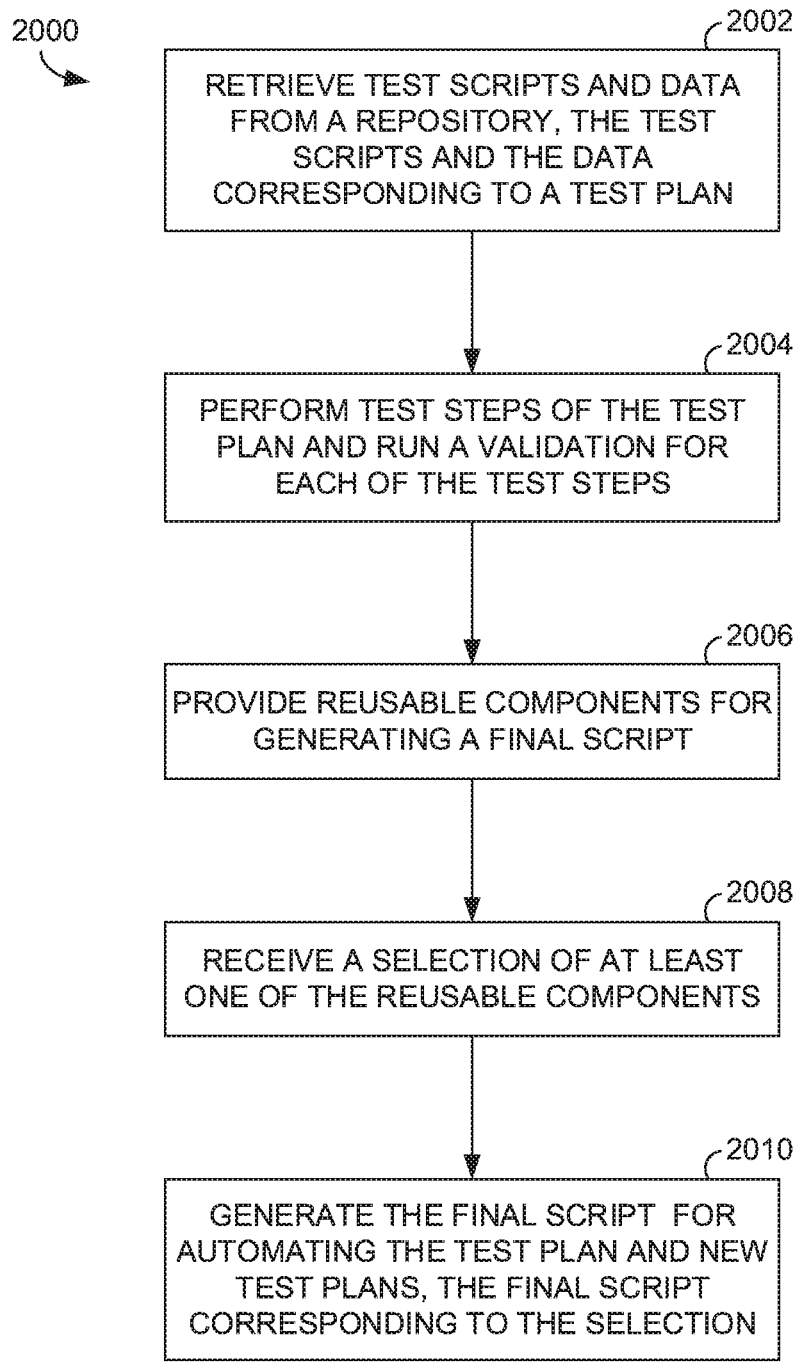
FIG. 20 is a flow chart for generating a final script for automating a test plan and new test plans, the final script corresponding to a selection, according to one embodiment.

Turning to FIG. 20, flow chart 2000 retrieves test scripts and data from a repository, the test scripts and the data corresponding to a test plan at 2002. At 2004, test steps of the test plan and run a validation for each of the test steps are performed. At 2006, reusable components for generating a final script are provided. At 2008, a selection of at least one of the reusable components is received. At 2010, the final script for automating the test plan and new test plans, the final script corresponding to the selection is generated.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described. Accordingly, the scope of the disclosure is intended to be limited only by the following claims.

The invention claimed is:

1. A method for suggesting a reusable component for a test step or a test validation, the method comprising:
   receiving, by an automated test generator (ATG) executing on a computing system, test suite data comprising test steps and one or more of: test plan data, test plan solution data, historical test plans and historical test scripts;
   identifying, by the ATG, one or more patterns between test steps and at least one of historical test scripts and historical test plans, at least by analyzing the test suite data to determine one or more patterns in the test suite data, wherein analyzing the test suite data includes natural language processing and static code analysis;
   generating, by the ATG, a hash code for the test suite data;
   identifying, by the ATG, a handler based on the hash code;
   identifying, by the ATG, a reusable component from the test suite data based on the identified one or more patterns in the test suite data and the identified handler;
   providing, by the ATG, for an automated test plan script, a suggestion of the identified reusable component for (1) at least one test step associated with the test plan script or (2) validation of the at least one test step;
   receiving, by the ATG, a selection of the suggestion of the reusable component;
   generating, by the ATG, the automated test plan script, the automated test plan script comprising the reusable component;
   executing the automated test plan script;
   determining, by the ATG, whether the reusable component failed during the execution of the automated test plan script; and
   responsive to a determination that the reusable component failed, modifying the reusable component.

2. The method of claim 1, wherein analyzing the test suite data using the natural language processing includes using a Rapid Automatic Keyword Extraction algorithm to identify a keyword.

3. The method of claim 2, further comprising:
   matching the keyword identified using the Rapid Automatic Keyword Extraction algorithm to one or more keywords corresponding to historical test plan data stored in a repository;
   identifying, based on the matching, a particular test plan and the test plan solution data for the particular test plan; and
   using the particular test plan and the test plan solution data for the particular test plan for providing the suggestion of the reusable component.

4. The method of claim 1, wherein analyzing the test suite data using the natural language processing includes using a domain independent keyword extraction algorithm to determine one or more key phrases of the test suite data to provide the suggestion of the reusable component.

5. The method of claim 1, further comprising enabling a selection for providing the suggestion as free text search without having to use a separate application.

6. The method of claim 1, further comprising:
   providing a second suggestion of a second reusable component for (1) at least one test step associated with the test plan script or (2) validation of the at least one test step, the second suggestion based on analyzing the test suite data using the natural language processing and the static code analysis;
   receiving a second selection of the second suggestion of the second reusable component; and
   generating the automated test plan script, the automated test plan script comprising the reusable component and the second reusable component.

7. The method of claim 1, further comprising receiving the test suite data associated with the test plan script in response to receiving a test plan identifier for the test plan script.

8. The method of claim 1, further comprising:
   determining a plurality of keywords of the test suite data using a domain independent keyword extraction algorithm;
   matching the plurality of keywords to reusable component tags stored in a test plan repository; and
   based on the matching, providing the suggestion of the reusable component.

9. The method of claim 1, further comprising providing a pause selection to a user to pause generation of the automated test plan script.

10. The method of claim 1, wherein the reusable component comprises source code.

11. One or more non-transitory computer-readable storage media having computer-executable instructions embodied thereon that, when executed by one or more processors, perform a method for suggesting a reusable component, the method comprising:
    receiving test suite data comprising test steps and one or more of: test steps, test plan data, test plan solution data, historical test plans and historical test scripts;
    identifying one or more patterns between test steps and at least one of historical test scripts and historical test plans, at least by analyzing the test suite data using natural language processing data to determine one or more patterns in the test suite data;
    generating a hash code for the test suite data;
    identifying a handler based on the hash code;
    identifying a reusable component from the test suite data based on the identified one or more patterns in the test suite data and the identified handler;
    providing, for an automated test plan script, a suggestion of the identified reusable component for validating at least one test step associated with the test plan script;
    receiving a selection of the suggestion of the reusable component;
    generating the automated test plan script, the automated test plan script comprising the reusable component;
    executing the automated test plan script;
    determining whether the reusable component failed during the execution of the automated test plan script; and
    responsive to a determination that the reusable component failed, modifying the reusable component.

12. The one or more non-transitory computer-readable storage media of claim 11, wherein the automated test plan script is usable for multiple test plans, and wherein the reusable component is used to automatically populate at least one test step of a plurality of test plan scripts.

13. The one or more non-transitory computer-readable storage media of claim 11, further comprising:
    receiving a test plan identifier for a second test plan script;
    populating test steps for the second test plan script using the reusable component; and based on the second test plan script populated using the reusable component, providing a suggestion of a second reusable component for each of the test steps of the second test plan script.

14. The one or more non-transitory computer-readable storage media of claim 13, wherein the second reusable component is suggested based on using static code analysis on source code of the test suite data corresponding to the second test plan script.

15. The one or more non-transitory computer-readable storage media of claim 14, further comprising providing a suggestion of a third reusable component for validating the test steps of the second test plan script based on a gap performance analysis of the second test plan script.

16. The one or more non-transitory computer-readable storage media of claim 11, wherein the suggestion of the reusable component is further provided based on identifying patterns of the test plan solution data by converting images of the test suite data using optical character recognition.

17. The one or more non-transitory computer-readable storage media of claim 16, further comprising classifying, using machine learning, the converted images into one or more categories to identify the patterns.

18. A system for suggesting a reusable component, the system comprising:
   one or more processors;
   one or more computer storage media having computer-executable instructions stored thereon that, when executed by the one or more processors, cause operations comprising:
   receive test suite data comprising test steps and one or more of: test steps, test plan data, test plan solution data, historical test plans and historical test scripts;
   identify one or more patterns between test steps and at least one of historical test scripts and historical test plans, at least by analyzing the test suite data using static code analysis data to determine one or more patterns in the test suite data;
   generate a hash code for the test suite data;
   identify a handler based on the hash code;
   identify a reusable component from the test suite data based on the identified one or more patterns in the test suite data and the identified handler;
   provide, for an automated test plan script, a suggestion of the identified reusable component for (1) at least one test step associated with the test plan script or (2) validation of the at least one test step;
   receive a selection of the suggestion of the reusable component;
   generate the automated test plan script, the automated test plan script comprising the reusable component;
   executing the automated test plan script;
   determining whether the reusable component failed during the execution of the automated test plan script; and
   responsive to a determination that the reusable component failed, modifying the reusable component.

19. The system of claim 18, the operations further comprising receive a selection to skip a first test step of the automated test plan script, wherein the reusable component corresponds to a second test step of the automated test plan script.

20. The system of claim 18, the operations further comprising:
   apply an optical character recognition (OCR) engine to one or more images of the test suite data and renaming an OCR value generated by the OCR engine, the OCR engine being trained using historical image data from a test plan repository; and
   provide the suggestion of the reusable component further based on the renamed OCR value.

* * * * *